US012681432B2

(12) United States Patent
Coene et al.

(10) Patent No.: US 12,681,432 B2
(45) Date of Patent: Jul. 14, 2026

(54) DARK FIELD DIGITAL HOLOGRAPHIC MICROSCOPE AND ASSOCIATED METROLOGY METHOD

(71) Applicant: ASML Netherlands B.V., Veldhoven (NL)

(72) Inventors: Willem Marie Julia Marcel Coene, Veldhoven (NL); Arie Jeffrey Den Boef, Waalre (NL); Vasco Tomas Tenner, Eindhoven (NL); Nitesh Pandey, Silicon Valley, CA (US); Christos Messinis, Amsterdam (NL); Johannes Fitzgerald De Boer, Amstelveen (NL)

(73) Assignee: ASML Netherlands B.V., Veldhoven (NL)

( * ) Notice: Subject to any disclaimer, the term of this patent is extended or adjusted under 35 U.S.C. 154(b) by 1041 days.

(21) Appl. No.: 17/787,244

(22) PCT Filed: Oct. 21, 2020

(86) PCT No.: PCT/EP2020/079540
§ 371 (c)(1),
(2) Date: Jun. 17, 2022

(87) PCT Pub. No.: WO2021/121733
PCT Pub. Date: Jun. 24, 2021

(65) Prior Publication Data
US 2023/0044632 A1     Feb. 9, 2023

(30) Foreign Application Priority Data

Dec. 17, 2019   (EP) ..................................... 19216970
Apr. 1, 2020   (EP) ..................................... 20167524

(51) Int. Cl.
*G03H 1/08*      (2006.01)
*G03H 1/00*      (2006.01)
(Continued)

(52) U.S. Cl.
CPC ........... *G03H 1/0866* (2013.01); *G03H 1/265* (2013.01); *G03H 2001/005* (2013.01); *G03H 2001/0473* (2013.01)

(58) Field of Classification Search
None
See application file for complete search history.

(56) References Cited

U.S. PATENT DOCUMENTS 6,078,392 A     6/2000 Thomas et al.
6,191,887 B1    2/2001 Michaloski et al.
(Continued)

FOREIGN PATENT DOCUMENTS

EP     1 628 164 A2     2/2006
EP     3 480 554 A1     5/2019
(Continued)

OTHER PUBLICATIONS

International Search Report and Written Opinion of the International Searching Authority directed to related International Patent Application No. PCT/EP2020/079540, mailed Feb. 5, 2021; 13 pages.

(Continued)

*Primary Examiner* — Jyotsna V Dabbi
(74) *Attorney, Agent, or Firm* — Finnegan, Henderson, Farabow, Garrett & Dunner LLP

(57) ABSTRACT

A dark field digital holographic microscope is disclosed which is configured to determine a characteristic of interest of a structure. The dark field digital holographic microscope comprises an illumination device configured to provide at least: a first beam pair comprising a first illumination beam
(Continued)

of radiation (1010) and a first reference beam of radiation (1030) and a second beam pair comprising a second illumination beam of radiation (1020) and a second reference beam of radiation (1040); and one or more optical elements (1070) operable to capture a first scattered radiation and to capture a second scattered radiation scattered by the structure resultant from the first and second illumination beams respectively. The beams of the first beam pair are mutually coherent and the beams of the second beam pair are mutually coherent. The illumination device is configured to impose incoherence (ADI) between the first beam pair and second beam pair.

19 Claims, 8 Drawing Sheets

(51) Int. Cl.
G03H 1/04 (2006.01)
G03H 1/26 (2006.01)

(56) References Cited

U.S. PATENT DOCUMENTS

| | | | |
|---|---|---|---|
| 6,256,093 | B1 | 7/2001 | Ravid et al. |
| 6,552,800 | B1 | 4/2003 | Wright et al. |
| 6,952,253 | B2 | 10/2005 | Lof et al. |
| 6,961,116 | B2 | 11/2005 | Den Boef et al. |
| 7,265,364 | B2 | 9/2007 | Teunissen et al. |
| 7,646,471 | B2 | 1/2010 | Teunissen et al. |
| 7,701,577 | B2 | 4/2010 | Straaijer et al. |
| 7,791,724 | B2 | 9/2010 | Den Boef et al. |
| 8,115,926 | B2 | 2/2012 | Straaijer |
| 8,451,440 | B2 | 5/2013 | Hahn et al. |
| 8,553,227 | B2 | 10/2013 | Jordanoska |
| 8,681,312 | B2 | 3/2014 | Straaijer |
| 8,692,994 | B2 | 4/2014 | Straaijer |
| 8,792,096 | B2 | 7/2014 | Straaijer |
| 8,797,554 | B2 | 8/2014 | Straaijer |
| 8,804,112 | B2 | 8/2014 | Shibata et al. |
| 8,823,922 | B2 | 9/2014 | Den Boef |
| 9,160,137 | B1 | 10/2015 | Abdolvand et al. |
| 9,176,072 | B2 | 11/2015 | Zhao et al. |
| 9,632,039 | B2 | 4/2017 | Den Boef et al. |
| 9,915,622 | B2 | 3/2018 | Romanovsky et al. |
| 11,009,343 | B2 | 5/2021 | Tinnemans et al. |
| 2006/0033921 | A1 | 2/2006 | Den Boef et al. |
| 2006/0066855 | A1 | 3/2006 | Boef et al. |
| 2008/0018966 | A1* | 1/2008 | Dubois .................. G02B 21/22 |
| | | | 359/9 |

| | | | |
|---|---|---|---|
| 2010/0201963 | A1 | 8/2010 | Cramer et al. |
| 2010/0233600 | A1 | 9/2010 | Den Boef et al. |
| 2010/0328655 | A1 | 12/2010 | Den Boef |
| 2011/0026032 | A1 | 2/2011 | Den Boef et al. |
| 2011/0027704 | A1 | 2/2011 | Cramer et al. |
| 2011/0043791 | A1 | 2/2011 | Smilde et al. |
| 2011/0102753 | A1 | 5/2011 | Van De Kerkhof et al. |
| 2011/0169944 | A1 | 7/2011 | Zhao et al. |
| 2011/0249244 | A1 | 10/2011 | Leewis et al. |
| 2012/0044470 | A1 | 2/2012 | Smilde et al. |
| 2012/0123581 | A1 | 5/2012 | Smilde et al. |
| 2013/0016346 | A1 | 1/2013 | Romanovsky et al. |
| 2013/0057935 | A1 | 3/2013 | Joo |
| 2013/0162996 | A1 | 6/2013 | Straaijer et al. |
| 2013/0258310 | A1 | 10/2013 | Smilde et al. |
| 2013/0271740 | A1 | 10/2013 | Quintanilha et al. |
| 2015/0261097 | A1 | 9/2015 | Mathijssen et al. |
| 2016/0161863 | A1 | 6/2016 | Den Boef et al. |
| 2016/0161864 | A1 | 6/2016 | Middlebrooks et al. |
| 2016/0370717 | A1 | 12/2016 | Den Boef et al. |
| 2018/0011022 | A1 | 1/2018 | Tahara et al. |
| 2019/0107781 | A1 | 4/2019 | Tinnemans et al. |
| 2019/0310559 | A1 | 10/2019 | De Boer et al. |

FOREIGN PATENT DOCUMENTS

| | | | | |
|---|---|---|---|---|
| EP | 3 531 191 A1 | 8/2019 | | |
| JP | H10-012542 A | 1/1998 | | |
| JP | 2017-076038 A | 4/2017 | | |
| NL | 2021848 A | * 10/2018 | .............. | G03F 7/20 |
| WO | WO 2004/094942 A2 | 11/2004 | | |
| WO | WO 2009/078708 A1 | 6/2009 | | |
| WO | WO 2009/106279 A1 | 9/2009 | | |
| WO | WO 2013/047709 A1 | 4/2013 | | |
| WO | WO 2013/178422 A1 | 12/2013 | | |
| WO | WO 2016/102127 A1 | 6/2016 | | |
| WO | WO 2019/068459 A1 | 4/2019 | | |
| WO | WO 2019/166190 A1 | 9/2019 | | |
| WO | WO 2019/197117 A1 | 10/2019 | | |

OTHER PUBLICATIONS

International Preliminary Report on Patentability directed to related International Patent Application No. PCT/EP2020/079540, issued May 17, 2022; 9 pages.

Pedrini et al., "Quantitative evaluation of two-dimensional dynamic deformations using digital holography," Optics and Laser Technology, vol. 29, No. 5, Jul. 1997; pp. 249-256.

Pedrini et al., "Simultaneous quantitative evaluation of in-plane and out-of-plane deformations by use of a multidirectional spatial carrier," Applied Optics, vol. 36, No. 4, Feb. 1, 1997; pp. 786-792.

* cited by examiner

DARK FIELD DIGITAL HOLOGRAPHIC MICROSCOPE AND ASSOCIATED METROLOGY METHOD

CROSS REFERENCE TO RELATED APPLICATIONS

This application claims priority of EP application 19216970.4 which was filed on 2019 Dec. 17 and EP application 20167524.6 which was filed on 2020 Apr. 1 and which is incorporated herein in its entirety by reference.

FIELD

The present invention relates to dark field digital holographic microscopy and in particular high speed dark field digital holographic microscopy and in relation to metrology applications in the manufacture of integrated circuits.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as CD=$k_1 \times \lambda$/NA, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

During the manufacturing process there is a need to inspect the manufactured structures and/or to measure characteristics of the manufactured structures. Suitable inspection and metrology apparatuses are known in the art. One of the known metrology apparatuses is a scatterometer and, for example, a dark field scatterometer.

Patent application publication US2016/0161864A1, patent application publication US2010/0328655A1 and patent application publication US2006/0066855A1 discuss embodiments of a photolithographic apparatus and embodiments of a scatterometer. The cited documents are herein incorporated by reference.

Dark field microscopes, such as the metrology device mentioned above, and more generally, have the problem of having the range of angles for illumination and detection limited, as it is required that the total range of angles (corresponding to regions within the angle resolved pupil) are shared between the illumination path and detection path. This limits the effective numerical aperture (NA) in illumination and/or detection. The issue of increasing effective NA of both illumination and detection has been addressed by implementing a sequential acquisition scheme. As a result, the measurement speed is undesirably low.

It is desirable to provide a dark field microscope with an increased effective NA of at least the detection optics, so as to improve resolution by capturing diffracted light over a larger range of diffraction angles.

SUMMARY

In a first aspect of the invention, there is provided a dark field digital holographic microscope configured to determine a characteristic of interest of a structure, comprising: an illumination device configured to provide at least: a first beam pair comprising a first illumination beam of radiation and a first reference beam of radiation and a second beam pair comprising a second illumination beam of radiation and a second reference beam of radiation, and an imaging branch being operable at least to detect a first scattered radiation scattered by said structure resultant from said structure being illuminated by said first illumination beam of radiation; and to detect a second scattered radiation scattered by said structure resultant from said structure being illuminated by said second illumination beam of radiation, said imaging branch having a detection NA greater than 0.1; wherein the illumination device is configured such that: the first illumination beam of radiation and the first reference beam of radiation are at least partially spatially and temporally coherent; the second illumination beam of radiation and the second reference beam of radiation are at least partially spatially and temporally coherent; and the illumination device is configured to impose spatial and/or temporal incoherence between the first beam pair and second beam pair.

In a second aspect of the invention, there is provided a method of determining a characteristic of interest of a target formed by a lithographic process on a substrate, the method comprising: illuminating said target with a first illumination beam of radiation and capturing resultant first scattered radiation, having been scattered from the target; illuminating said target with a second illumination beam of radiation and capturing resultant second scattered radiation, having been scattered from the target; imposing spatial and/or temporal incoherence between a first beam pair comprising said first illumination beam and said a first reference beam and a second beam pair comprising said second illumination beam and said second reference beam, such that: the beams of said first beam pair are at least partially spatially and temporally coherent, the beams of said second beam pair are at least partially spatially and temporally coherent, and any beam of said first beam pair is spatially and/or temporally incoherent to any beam of said second beam pair; and simultaneously generating a first interference pattern resulting from interference of the first scattered radiation and the first reference beam of radiation; and a second interference pattern resulting from interference of said second scattered radiation and the second reference beam.

BRIEF DESCRIPTION OF THE DRAWINGS

Embodiments of the invention will now be described, by way of example only, with reference to the accompanying schematic drawings, in which.

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figures 1, 2:
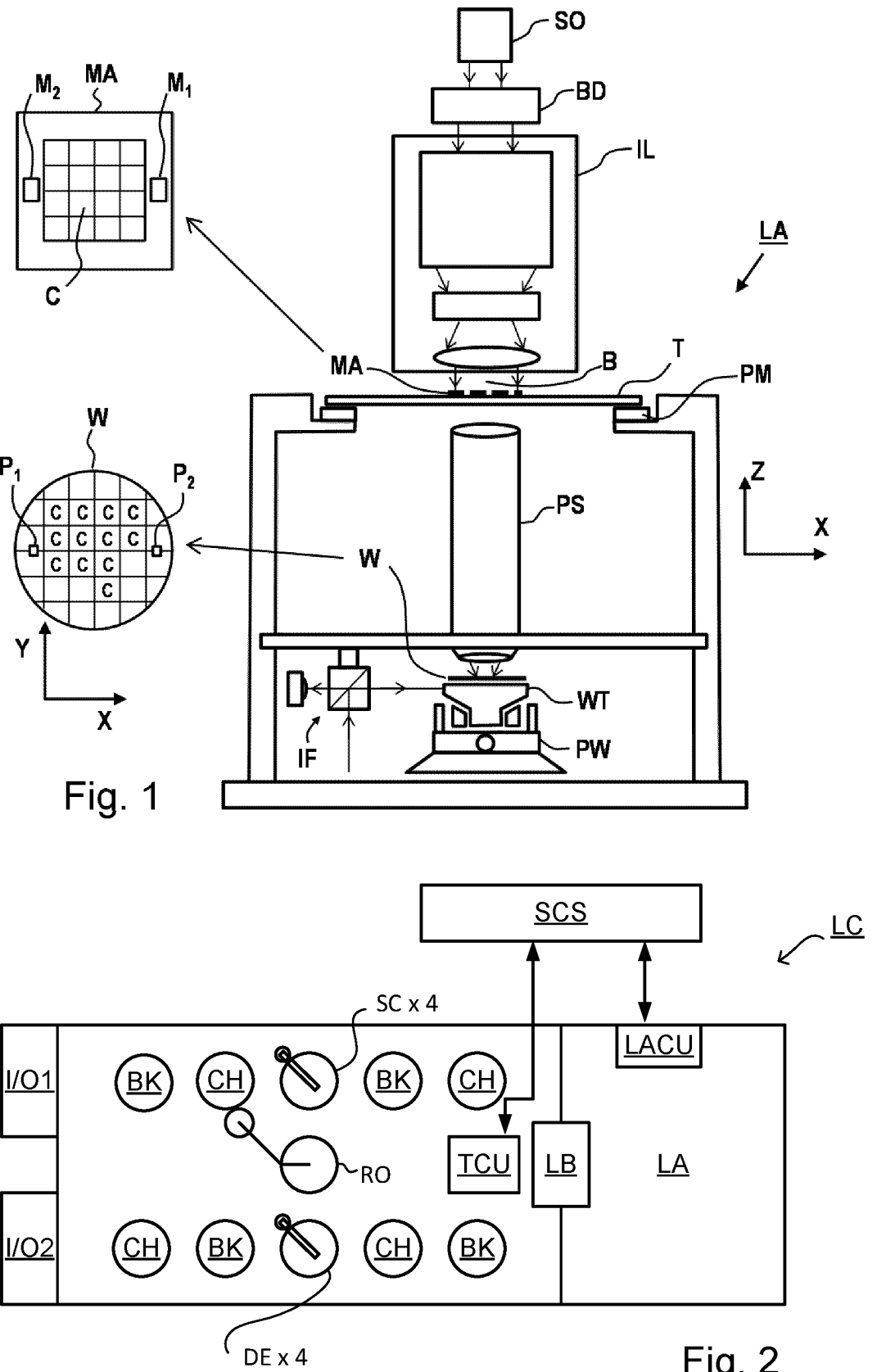
FIG. 1 depicts a schematic overview of a lithographic apparatus.
FIG. 2 depicts a schematic overview of a lithographic cell.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) MT constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support MT, and is patterned by the pattern (design layout) present on patterning device MA. Having traversed the mask MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer.

The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
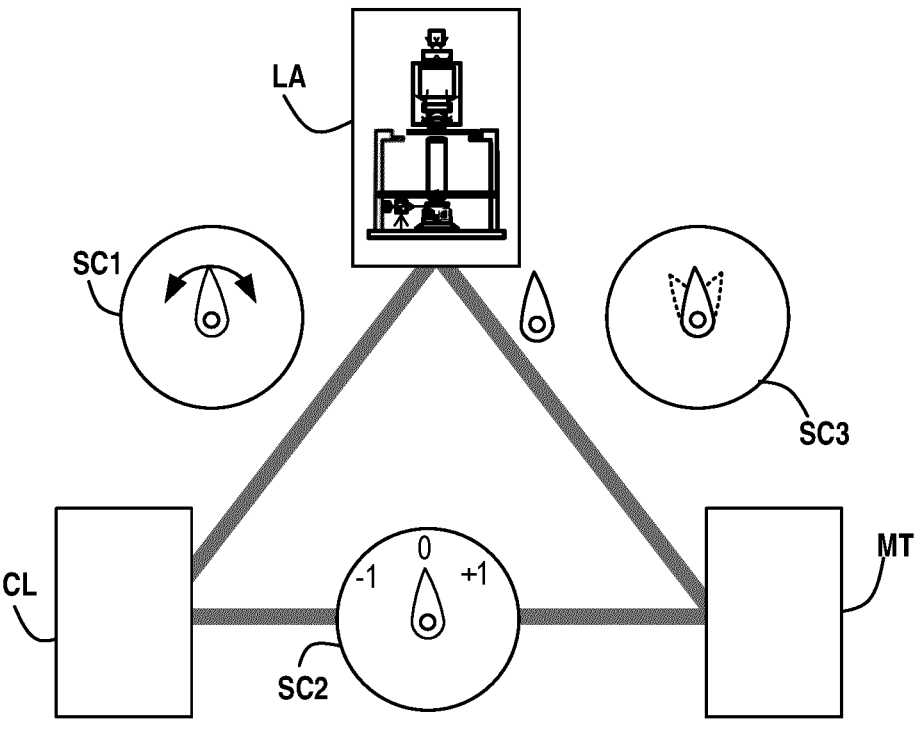
FIG. 3 depicts a schematic representation of holistic lithography, representing a cooperation between three key technologies to optimize semiconductor manufacturing.

Typically the patterning process in a lithographic apparatus LA is one of the most critical steps in the processing which requires high accuracy of dimensioning and placement of structures on the substrate W. To ensure this high accuracy, three systems may be combined in a so called "holistic" control environment as schematically depicted in FIG. 3. One of these systems is the lithographic apparatus LA which is (virtually) connected to a metrology tool MT (a second system) and to a computer system CL (a third system). The key of such "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

In lithographic processes, it is desirable to make frequently measurements of the structures created, e.g., for process control and verification. Tools to make such measurement are typically called metrology tools MT. Different types of metrology tools MT for making such measurements are known, including scanning electron microscopes or various forms of scatterometer metrology tools MT. Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in patent applications US20100328655, US2011102753A1, US20120044470A, US20110249244, US20110026032 or EP1,628,164A, incorporated herein by reference in their entirety. Aforementioned scatterometers may measure gratings using light from soft x-ray and visible to near-IR wavelength range.

In a first embodiment, the scatterometer MT is an angular resolved scatterometer. In such a scatterometer reconstruction methods may be applied to the measured signal to reconstruct or calculate properties of the grating. Such reconstruction may, for example, result from simulating interaction of scattered radiation with a mathematical model of the target structure and comparing the simulation results with those of a measurement. Parameters of the mathematical model are adjusted until the simulated interaction produces a diffraction pattern similar to that observed from the real target.

In a second embodiment, the scatterometer MT is a spectroscopic scatterometer MT. In such spectroscopic scatterometer MT, the radiation emitted by a radiation source is directed onto the target and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In a third embodiment, the scatterometer MT is a ellipsometric scatterometer. The ellipsometric scatterometer allows for determining parameters of a lithographic process by measuring scattered radiation for each polarization states. Such metrology apparatus emits polarized light (such as linear, circular, or elliptic) by using, for example, appropriate polarization filters in the illumination section of the metrology apparatus. A source suitable for the metrology apparatus may provide polarized radiation as well. Various embodiments of existing ellipsometric scatterometers are described in U.S. patent application Ser. Nos. 11/451,599, 11/708,678, 12/256,780, 12/486,449, 12/920,968, 12/922, 587, 13/000,229, 13/033,135, 13/533,110 and 13/891,410 incorporated herein by reference in their entirety.

Figure 4:
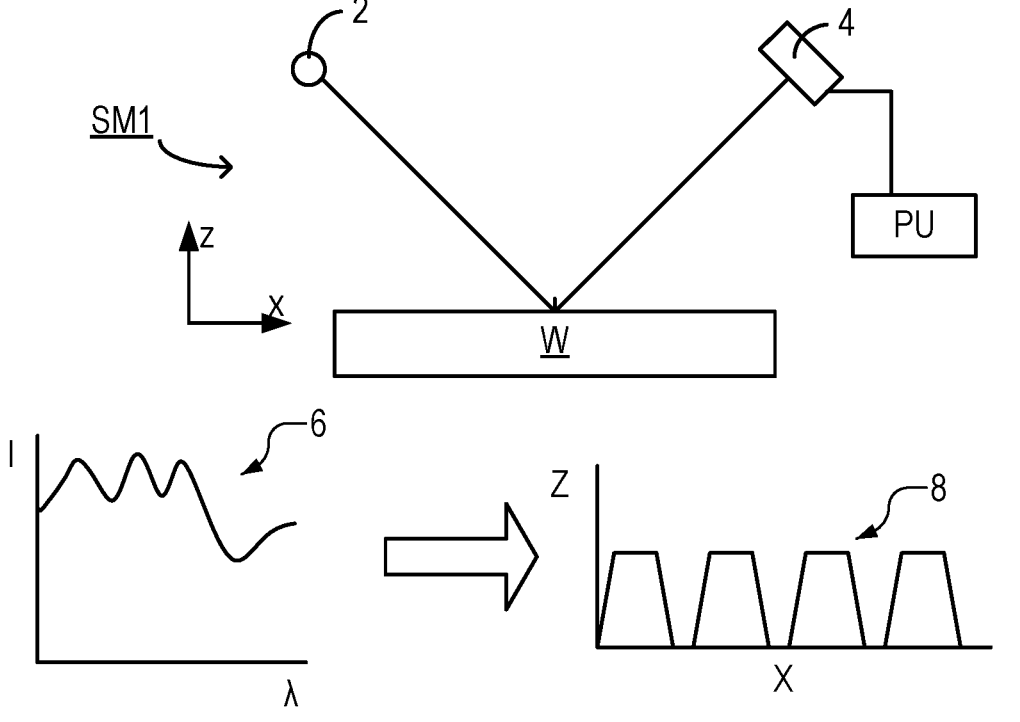
FIG. 4 depicts a schematic overview of a scatterometry apparatus used as a metrology device, which may comprise a dark field digital holographic microscope according to embodiments of the invention.

A metrology apparatus, such as a scatterometer, is depicted in FIG. 4. It comprises a broadband (white light) radiation projector 2 which projects radiation onto a substrate W. The reflected or scattered radiation is passed to a spectrometer detector 4, which measures a spectrum 6 (i.e. a measurement of intensity as a function of wavelength) of the specular reflected radiation. From this data, the structure or profile 8 giving rise to the detected spectrum may be reconstructed by processing unit PU, e.g. by Rigorous Coupled Wave Analysis and non-linear regression or by comparison with a library of simulated spectra as shown at the bottom of FIG. 3. In general, for the reconstruction, the general form of the structure is known and some parameters are assumed from knowledge of the process by which the structure was made, leaving only a few parameters of the structure to be determined from the scatterometry data. Such a scatterometer may be configured as a normal-incidence scatterometer or an oblique-incidence scatterometer.

Overall measurement quality of a lithographic parameter via measurement of a metrology target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in US patent application US2016-0161863 and published US patent application US 2016/0370717A1 incorporated herein by reference in its entirety.

Another type of metrology tool used in IC manufacture is a topography measurement system, level sensor or height sensor. Such a tool may be integrated in the lithographic apparatus, for measuring a topography of a top surface of a substrate (or wafer). A map of the topography of the substrate, also referred to as height map, may be generated from these measurements indicating a height of the substrate as a function of the position on the substrate. This height map may subsequently be used to correct the position of the substrate during transfer of the pattern on the substrate, in order to provide an aerial image of the patterning device in a properly focus position on the substrate. It will be understood that "height" in this context refers to a dimension broadly out of the plane to the substrate (also referred to as Z-axis). Typically, the level or height sensor performs measurements at a fixed location (relative to its own optical system) and a relative movement between the substrate and the optical system of the level or height sensor results in height measurements at locations across the substrate.

Figure 5:
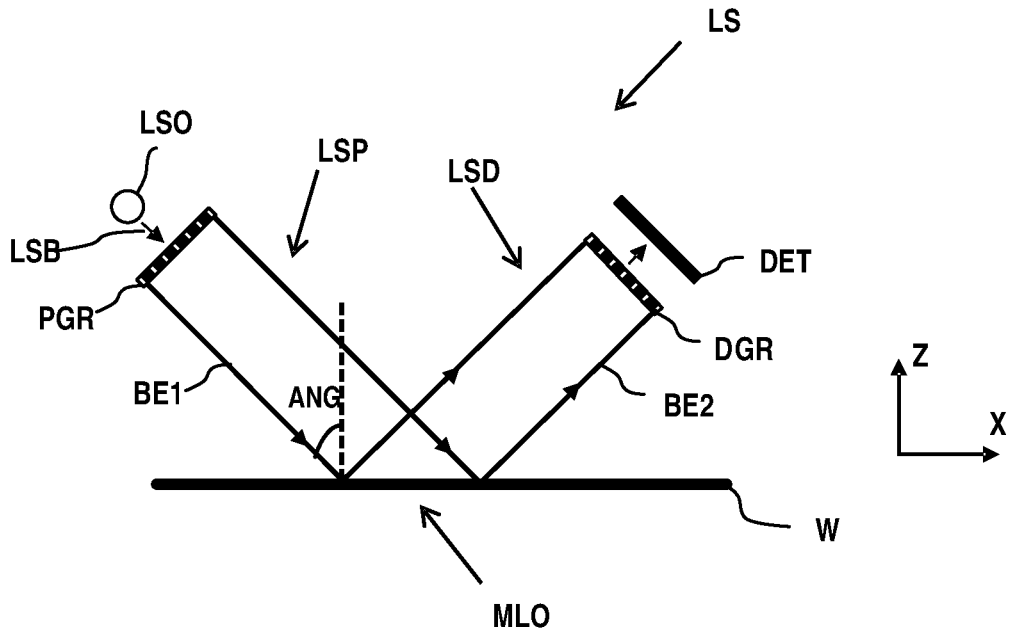
FIG. 5 depicts a schematic overview of a level sensor apparatus which may comprise a dark field digital holographic microscope according to embodiments of the invention.

An example of a level or height sensor LS as known in the art is schematically shown in FIG. 5, which illustrates only the principles of operation. In this example, the level sensor comprises an optical system, which includes a projection unit LSP and a detection unit LSD. The projection unit LSP comprises a radiation source LSO providing a beam of radiation LSB which is imparted by a projection grating PGR of the projection unit LSP. The radiation source LSO may be, for example, a narrowband or broadband light source, such as a supercontinuum light source, polarized or non-polarized, pulsed or continuous, such as a polarized or non-polarized laser beam. The radiation source LSO may include a plurality of radiation sources having different colors, or wavelength ranges, such as a plurality of LEDs. The radiation source LSO of the level sensor LS is not restricted to visible radiation, but may additionally or alternatively encompass UV and/or IR radiation and any range of wavelengths suitable to reflect from a surface of a substrate.

The projection grating PGR is a periodic grating comprising a periodic structure resulting in a beam of radiation BE1 having a periodically varying intensity. The beam of radiation BE1 with the periodically varying intensity is directed towards a measurement location MLO on a substrate W having an angle of incidence ANG with respect to an axis perpendicular (Z-axis) to the incident substrate surface between 0 degrees and 90 degrees, typically between 70 degrees and 80 degrees. At the measurement location MLO, the patterned beam of radiation BE1 is reflected by the substrate W (indicated by arrows BE2) and directed towards the detection unit LSD.

In order to determine the height level at the measurement location MLO, the level sensor further comprises a detection system comprising a detection grating DGR, a detector DET and a processing unit (not shown) for processing an output signal of the detector DET. The detection grating DGR may be identical to the projection grating PGR. The detector DET produces a detector output signal indicative of the light received, for example indicative of the intensity of the light received, such as a photodetector, or representative of a spatial distribution of the intensity received, such as a camera. The detector DET may comprise any combination of one or more detector types.

By means of triangulation techniques, the height level at the measurement location MLO can be determined. The detected height level is typically related to the signal strength as measured by the detector DET, the signal strength having a periodicity that depends, amongst others, on the design of the projection grating PGR and the (oblique) angle of incidence ANG.

The projection unit LSP and/or the detection unit LSD may include further optical elements, such as lenses and/or mirrors, along the path of the patterned beam of radiation between the projection grating PGR and the detection grating DGR (not shown).

In an embodiment, the detection grating DGR may be omitted, and the detector DET may be placed at the position where the detection grating DGR is located. Such a configuration provides a more direct detection of the image of the projection grating PGR.

In order to cover the surface of the substrate W effectively, a level sensor LS may be configured to project an array of measurement beams BE1 onto the surface of the substrate W, thereby generating an array of measurement areas MLO or spots covering a larger measurement range.

Various height sensors of a general type are disclosed for example in U.S. Pat. Nos. 7,265,364 and 7,646,471, both incorporated by reference. A height sensor using UV radiation instead of visible or infrared radiation is disclosed in US2010233600A1, incorporated by reference. In WO2016102127A1, incorporated by reference, a compact height sensor is described which uses a multi-element detector to detect and recognize the position of a grating image, without needing a detection grating.

Another type of metrology tool used in IC manufacture is an alignment sensor. A critical aspect of performance of the lithographic apparatus is therefore the ability to place the applied pattern correctly and accurately in relation to features laid down in previous layers (by the same apparatus or a different lithographic apparatus). For this purpose, the substrate is provided with one or more sets of marks or targets. Each mark is a structure whose position can be measured at a later time using a position sensor, typically an optical position sensor. The position sensor may be referred to as "alignment sensor" and marks may be referred to as "alignment marks".

A lithographic apparatus may include one or more (e.g. a plurality of) alignment sensors by which positions of alignment marks provided on a substrate can be measured accurately. Alignment (or position) sensors may use optical phenomena such as diffraction and interference to obtain position information from alignment marks formed on the substrate. An example of an alignment sensor used in current lithographic apparatus is based on a self-referencing interferometer as described in U.S. Pat. No. 6,961,116. Various enhancements and modifications of the position sensor have been developed, for example as disclosed in US2015261097A1. The contents of all of these publications are incorporated herein by reference.

Figure 6:
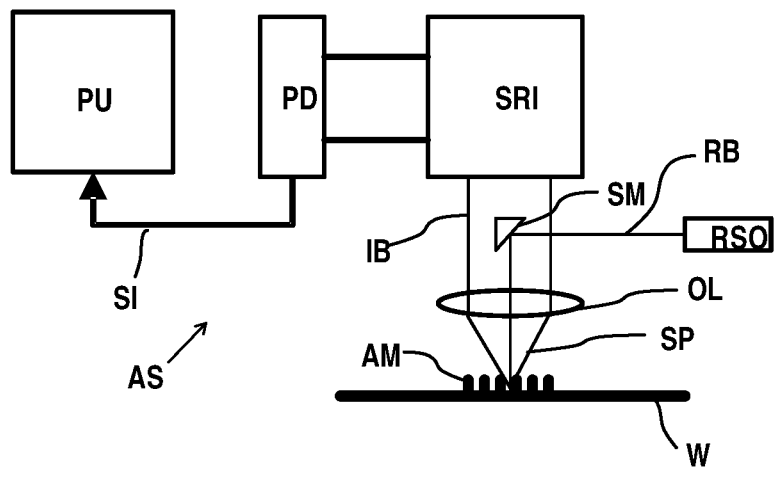
FIG. 6 depicts a schematic overview of an alignment sensor apparatus which may comprise a dark field digital holographic microscope according to embodiments of the invention.

FIG. 6 is a schematic block diagram of an embodiment of a known alignment sensor AS, such as is described, for example, in U.S. Pat. No. 6,961,116, and which is incorporated by reference. Radiation source RSO provides a beam RB of radiation of one or more wavelengths, which is diverted by diverting optics onto a mark, such as mark AM located on substrate W, as an illumination spot SP. In this example the diverting optics comprises a spot mirror SM and an objective lens OL. The illumination spot SP, by which the mark AM is illuminated, may be slightly smaller in diameter than the width of the mark itself.

Radiation diffracted by the alignment mark AM is collimated (in this example via the objective lens OL) into an information-carrying beam IB. The term "diffracted" is intended to include zero-order diffraction from the mark (which may be referred to as reflection). A self-referencing interferometer SRI, e.g. of the type disclosed in U.S. Pat. No. 6,961,116 mentioned above, interferes the beam IB with itself after which the beam is received by a photodetector PD. Additional optics (not shown) may be included to provide separate beams in case more than one wavelength is created by the radiation source RSO. The photodetector may be a single element, or it may comprise a number of pixels, if desired. The photodetector may comprise a sensor array.

The diverting optics, which in this example comprises the spot mirror SM, may also serve to block zero order radiation reflected from the mark, so that the information-carrying beam IB comprises only higher order diffracted radiation from the mark AM (this is not essential to the measurement, but improves signal to noise ratios).

Intensity signals SI are supplied to a processing unit PU. By a combination of optical processing in the block SRI and computational processing in the unit PU, values for X- and Y-position on the substrate relative to a reference frame are output.

A single measurement of the type illustrated only fixes the position of the mark within a certain range corresponding to one pitch of the mark. Coarser measurement techniques are used in conjunction with this to identify which period of a sine wave is the one containing the marked position. The same process at coarser and/or finer levels may be repeated at different wavelengths for increased accuracy and/or for robust detection of the mark irrespective of the materials from which the mark is made, and materials on and/or below which the mark is provided. The wavelengths may be multiplexed and de-multiplexed optically so as to be processed simultaneously, and/or they may be multiplexed by time division or frequency division.

In this example, the alignment sensor and spot SP remain stationary, while it is the substrate W that moves. The alignment sensor can thus be mounted rigidly and accurately to a reference frame, while effectively scanning the mark AM in a direction opposite to the direction of movement of substrate W. The substrate W is controlled in this movement by its mounting on a substrate support and a substrate positioning system controlling the movement of the substrate support. A substrate support position sensor (e.g. an interferometer) measures the position of the substrate support (not shown). In an embodiment, one or more (alignment) marks are provided on the substrate support. A measurement of the position of the marks provided on the substrate support allows the position of the substrate support as determined by the position sensor to be calibrated (e.g. relative to a frame to which the alignment system is connected). A measurement of the position of the alignment marks provided on the substrate allows the position of the substrate relative to the substrate support to be determined.

In order to monitor the lithographic process, parameters of the patterned substrate are measured. Parameters may include, for example, the overlay error between successive layers formed in or on the patterned substrate. This measurement may be performed on a product substrate and/or on a dedicated metrology target. There are various techniques for making measurements of the microscopic structures formed in lithographic processes, including the use of scanning electron microscopes and various specialized tools. A fast and non-invasive form of specialized inspection tool is a scatterometer in which a beam of radiation is directed onto a target on the surface of the substrate and properties of the scattered or reflected beam are measured.

Examples of known scatterometers include angle-resolved scatterometers of the type described in US2006033921A1 and US2010201963A1. The targets used by such scatterometers are relatively large, e.g., 40 µm by 40 µm, gratings and the measurement beam generates a spot that is smaller than the grating (i.e., the grating is under-filled). In addition to measurement of feature shapes by reconstruction, diffraction based overlay can be measured using such apparatus, as described in published patent application US2006066855A1. Diffraction-based overlay metrology using dark field imaging of the diffraction orders enables overlay measurements on smaller targets. Examples of dark field imaging metrology can be found in international patent applications WO 2009/078708 and WO 2009/106279 which documents are hereby incorporated by reference in their entirety. Further developments of the technique have been described in published patent publications US20110027704A, US20110043791A, US2011102753A1, US20120044470A, US20120123581A, US20130258310A, US20130271740A and WO2013178422A1. These targets can be smaller than the illumination spot and may be surrounded by product structures on a wafer. Multiple gratings can be measured in one image, using a composite grating target. The contents of all these applications are also incorporated herein by reference.

Dark field microscopes, such as the metrology device mentioned above and more generally, have the problem of having a limited range of angles for illumination of the target and/or detection of the light that is diffracted by the target, as it may be required that the total range of angles (corresponding to regions within the angle resolved pupil) are shared between the illumination path and detection path. This limits the effective NA in illumination and detection.

In a diffraction-based dark field metrology device, a beam of radiation is directed onto a metrology target and one or more properties of the scattered radiation are measured so as to determine a property of interest of the target. The properties of the scattered radiation may comprise, for example, intensity at a single scattering angle (e.g., as a function of wavelength) or intensity at one or more wavelengths as a function of scattering angle.

Measurement of targets in dark field metrology may comprise, for example, measuring the a first intensity of the $1^{st}$ diffraction order $I_{+1}$ and a second intensity of the $-1^{st}$ diffraction order ($I_{-1}$) and calculating an intensity asymmetry ($A=I_{+1}-I_{-1}$), which is indicative of asymmetry in the target. The metrology targets may comprise one or more grating structures from which a parameter of interest may be inferred from such intensity asymmetry measurements, e.g., the targets are designed such that the asymmetry in the target varies with the parameter of interest. For example, in overlay metrology a target may comprise at least one composite grating formed by at least a pair of overlapping sub-gratings that are patterned in different layers of the semiconductor device. Asymmetry of the target will therefore be dependent on alignment of the two layers and therefore overlay. Other targets may be formed with structures which are exposed with different degrees of variation based on the focus setting used during the exposure; the measurement of which enabling that focus setting to be inferred back (again through intensity asymmetry).

Figure 7:
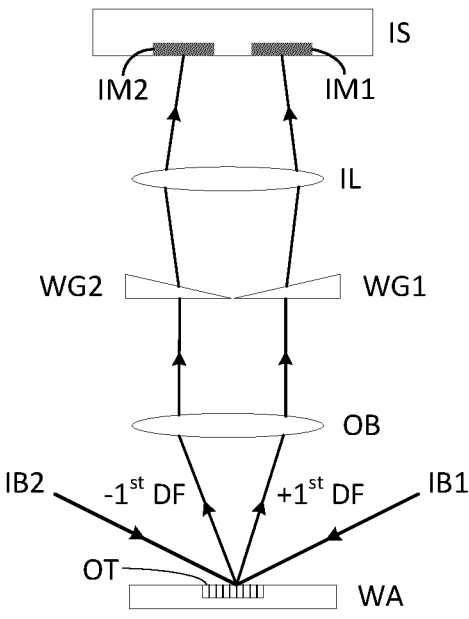
FIG. 7 depicts schematically an example of a diffraction-based dark field metrology device operated in a parallel acquisition scheme.
Figure 8:
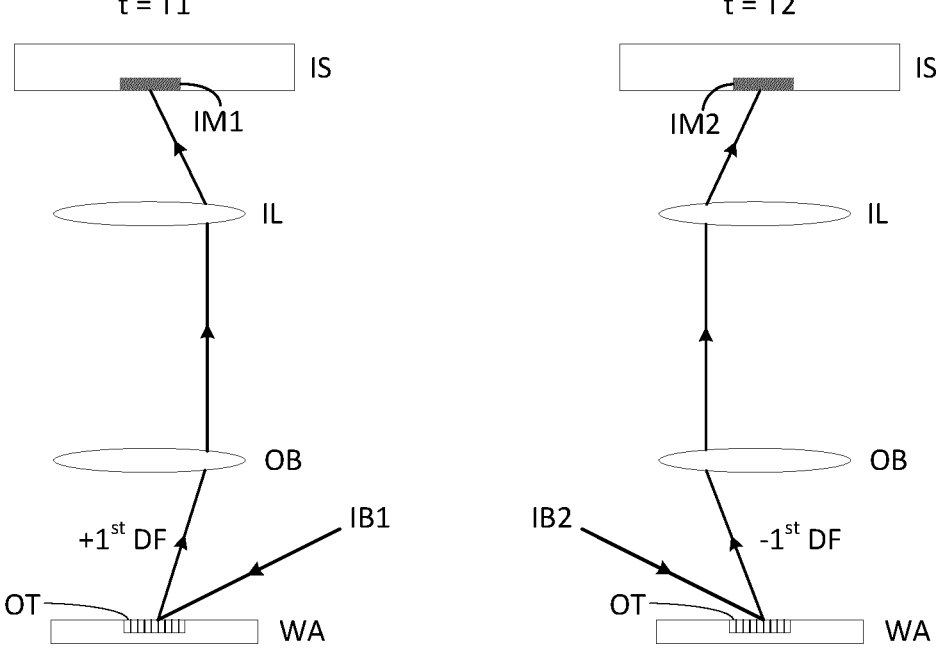
FIG. 8 depicts schematically a different example of a diffraction-based dark field metrology device operated in a sequential acquisition scheme.

FIG. 7 and FIG. 8 schematically illustrate two examples of diffraction-based dark field metrology devices. Note that for the sake of simplicity, both figures only show some of the components that are sufficient for the purpose of describing working principle of the two devices.

As illustrated in FIG. 7, a first illumination beam of radiation IB1 may be obliquely incident onto an overlay target of a substrate WA from one side of the device. The grating based overlay target may diffract the first illumination beam into a number of diffraction orders. Since the device is configured for dark field imaging, the zeroth diffraction order may be either blocked by an optical component or configure to fall completely outside the numerical aperture of the objective lens OB. At least one non-zeroth diffraction order, e.g., positive first diffraction order $+1^{st}$ DF, may be collected by the objective lens OB. At the pupil plane of the objective lens OB, a first wedge WG1 may be used to re-direct the diffracted radiation to follow a desired beam path. Finally, an imaging lens may be used to focus the diffraction order, e.g., positive first diffraction order $+1^{st}$ DF, onto an image sensor IS such that a first image IM1 is formed at a first location.

Similarly, a second illumination beam of radiation IB2 may be obliquely incident onto the same overlay target OT of the substrate WA from the opposite side of the system. The incident angle of the second illumination beam IB2 may be same as that of the first illumination beam IB1. At least one non-zeroth diffraction order, e.g., negative first diffraction order $-1^{st}$ DF, and may be collected by the objective lens OB and subsequently redirected by a second wedge WG2. The negative first diffraction order $-1^{st}$ DF may then be focused by the imaging lens IL onto the image sensor IS such that a second image IM2 is formed at a second location.

The example of FIG. 7 is operated in a parallel acquisition scheme. The overlay target is illuminated simultaneously by both illumination beams IB1, IB2. Correspondingly, the two spatially separated images IM1, IM2 of the overlay target are acquired at the same time. Such a parallel acquisition scheme allows for a fast measurement speed and hence high throughput. However, the pupil plane of the objective lens OB has to be shared by the two diffraction orders, e.g., $+1^{st}$ DF and $-1^{st}$ DF. A consequence of dividing the pupil into mutually exclusive illumination and detection pupils is that there is a consequent reduction in the illumination NA and in the detection NA. While there is some flexibility in trade-off between the illumination NA and detection NA, ultimately having both the illumination NA the detection NA as large as is often desirable is not possible within a single pupil. This results in a limited range of angles for each corresponding illumination beam and for the $+1^{st}$ DF and $-1^{st}$ DF beams, which in turn limits the range of allowable grating pitch sizes and/or illumination wavelengths and hence imposes a tight requirement for designing such a metrology system.

FIG. 8 schematically illustrates another exemplary dark field metrology device (or different operation mode of the device of FIG. 7). The main difference is that the metrology device of FIG. 8 is operated in a sequential acquisition scheme. In the sequential acquisition scheme, a metrology target OT is only illuminated by one illumination beam from one direction at any time instance and thereby only one image of the target is formed and acquired at any point in time. Referring to FIG. 8, at a first time instance t=T1, a first illumination beam IB1 may be switched on and directed obliquely onto an overlay target OT of a substrate WA from one side of the metrology device. After interaction with the gratings of the overlay target, a number of diffraction orders may be generated. At least one of the non-zeroth diffraction order, e.g., positive first diffraction order $+1^{st}$ DF, may be collected by an objective lens OB and subsequently focused by an imaging lens IL onto an image sensor IS.

Subsequent to the first image IM1 of the overlay gratings being acquired, at a second time instance t=T2, the first illumination beam IB1 is switched off and a second illumination beam IB2 is switched on. The second illumination beam IB2 may be directly obliquely onto the same overlay target from an opposite side of the metrology device. At least one of the generated diffraction orders, e.g., negative first diffraction order $-1^{st}$ DF, may be collected by the objective lens OB and subsequently focused onto the image sensor IS to form a second image IM2 of the overlay target. Note that both images IM1 and IM2 may be formed at a common position on the image sensor.

With this time multiplexed acquisition scheme, the full NA of the objective lens OB is made available for detecting the diffracted beams $+1^{st}$ DF and $-1^{st}$ DF. No limitation in objective NA means a wider range of relevant design parameters, such as grating pitch sizes, illumination wavelengths and illumination angles, is allowed and a greater flexibility in system design can be obtained. However, the fact that multiple image acquisitions are needed means measurement speed is reduced and hence system throughput is impacted.

In addition, accurate determination of e.g., overlay error, relies on accurate measurement of a minute relative intensity difference (or intensity asymmetry) between the two acquired images IM1, IM2. The typical relative intensity difference is on the order of $10^{-4}$ of the intensity of one of the acquired images, e.g., IM1 or IM2. Such a small intensity difference could easily be dwarfed by any intensity and/or wavelength fluctuations of illumination radiation. Therefore, the illumination beams are required to stay stable during consecutive image acquisitions. This can be achieved by using a stable light source providing desired intensity and wavelength stabilities. Alternatively, additional hardware and software, such as for example intensity/wavelength monitoring device and corresponding feedback control loop, should be incorporated into the metrology device such that intensity and/or wavelength fluctuations of the illumination beams are actively monitored and well compensated. In some cases, an intensity monitoring device may be used to actively track the intensity of the illumination beams. The signal generated from the intensity monitoring device may be used to (e.g., electronically) correct the intensity fluctuations of the illumination beams. All these solutions add complexity and cost to the overall system.

Some or all of aforementioned problems could be addressed by using digital holographic microscopy, in particular dark field digital holographic microscopy. Digital holographic microscopy is an imaging technology that combines holography with microscopy. Different from other microscopy methods that record projected images of an object, digital holographic microscopy records holograms formed by interference between object radiation obtained by irradiation of a three-dimensional (3D) object with reference radiation that is coherent with the object radiation. Images may be captured using, for example a charge coupled device (CCD) or a complementary metal oxide semiconductor (CMOS). Since the object radiation is radiation scattered from the object, wave-front of the object radiation is therefore modulated or shaped by the object. Said scattered radiation may comprise reflected radiation, diffracted radiation, or transmitted radiation. Therefore, the wavefront of the object radiation carries information of the irradiated object, e.g., 3D shape information. Based on the captured images of holograms, images of the object can be numerically reconstructed by using a computer reconstruction algorithm. An important advantage of hologram based metrology over intensity based metrology, as described in examples of FIGS. 7 and 8, is that hologram based metrology allows both intensity and phase information of an object to be obtained. With additional phase information, characteristics of the object can be determined with better accuracy.

Figure 9:
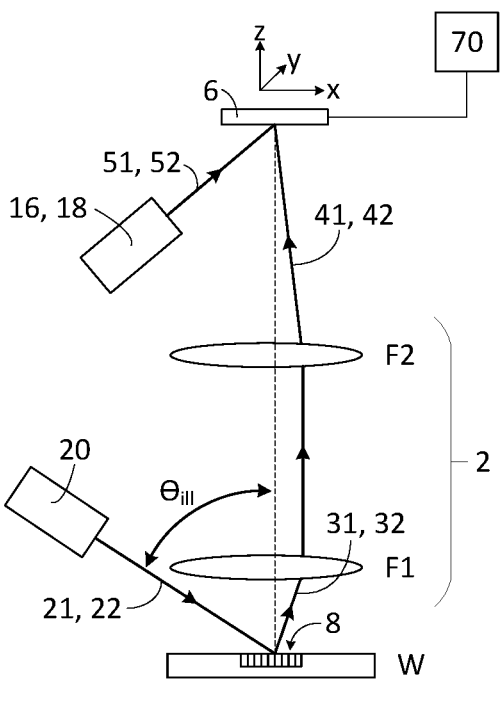
FIG. 9 depicts schematically an example of a dark field digital holographic microscope operated in a sequential acquisition scheme.

The international patent application WO2019197117A1, incorporated herein by reference, discloses a method and metrology apparatus based on a dark field digital holographic microscope (df-DHM) to determine a characteristic, e.g., overlay, of a structure manufactured on a substrate. For the purpose of description, FIG. 3 of the international patent application WO2019197117A1 is replicated in FIG. 9. FIG. 9 schematically illustrates the disclosed df-DHM specifically adapted for use in lithographic process metrology.

In comparison to the former examples shown in FIGS. 7 and 8, the df-DHM in FIG. 9 further comprises a reference optical unit 16, 18 which is used to provide additional two reference radiation beams 51, 52 (the reference radiation). Such two reference radiation beams 51, 52 are respectively paired with two corresponding portions 41, 42 of the scattered radiation beams 31, 32 (the object radiation). The two scattered-reference beam pairs are used sequentially to form two interference patterns. Coherence control is provided by way of adjusting the relative optical path-length difference (OPD) between the two scattered-reference beams within each beam pair. However, no coherence control is available between the two beam pairs.

Due to the use of a single light source and insufficient coherence control, all four radiation beams, i.e. the first portion 41 of the scattered radiation 31, the first reference radiation 51, the second portion 42 of the scattered radiation 32 and the second reference radiation 52, are mutually coherent. If these four mutually coherent radiation beams were allowed to reach the same position of the sensor 6 at the same time, namely operating in a parallel acquisition scheme, multiple interference patterns comprising desired information containing patterns and undesired artefact-contributing patterns would overlap each other. The undesired interference patterns may be formed by interference between e.g., the portion 41 of the first scattered radiation 31 and the portion 42 of the second scattered radiation 32. Since it would be technically challenging and time consuming to completely separate the superimposed interference patterns, parallel acquisition is impractical this arrangement.

Similar to the example of FIG. 8, the use of a sequential acquisition scheme in the example of FIG. 9 allows the full NA of the objective lens to be available for both illumination and detection. However, the system suffers the same problem of low measurement speed due to sequential acquisition. Therefore, it is desirable to have a df-DHM capable of performing parallel acquisition such that a high measurement speed and a high design flexibility can be simultaneously obtained.

Figure 10:
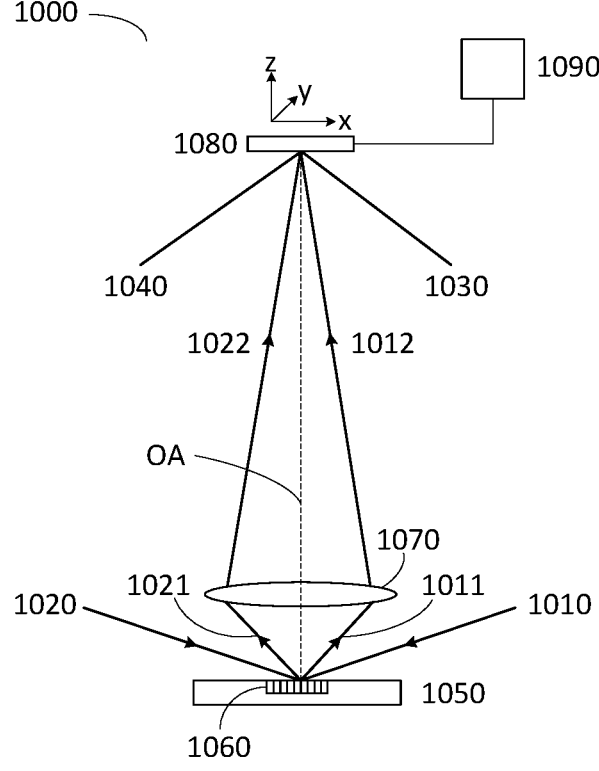
FIG. 10 depicts schematically a dark field digital holographic microscope (df-DHM) operated in a parallel acquisition scheme, in accordance with an embodiment.

FIG. 10 schematically illustrates the imaging branch of a dark field digital holographic microscope (df-DHM) 1000 in accordance with an embodiment. A dark field digital holographic microscope (df-DHM) comprises an imaging branch and an illumination branch. In this embodiment, a metrology target 1060 comprising a structure on a substrate 1050 is illuminated by two illumination beams of radiation, i.e., a first illumination beam of radiation 1010 and a second illumination beam of radiation 1020. In an embodiment, such two illumination beams 1010, 1020 may simultaneously illuminate the metrology target 1060.

In an embodiment, the first illumination beam 1010 may be incident on the metrology target 1060 at a first angle of incidence in a first direction with respect to the optical axis OA. The second illumination beam 1020 may be incident on the metrology target 1060 at a second angle of incidence in a second direction with respect to the optical axis OA. The first angle of incidence of the first illumination beam 1010 and the second angle of incidence of the second illumination beam 1020 may be substantially the same. The angle of incidence of each illumination beam may be, for example in the range of 70 degrees to 90 degrees, in the range of 50 degrees to 90 degrees, in the range of 30 degrees to 90 degrees, in the range of 10 degrees to 90 degrees. The illumination of the metrology target 1060 may result in radiation being scattered from the target. In an embodiment, the first illumination beam 1010 may be incident on the metrology target 1060 at a first azimuthal angle, corresponding to the first direction. The second illumination beam 1020 may be incident on the metrology target 1060 at a second azimuthal angle, corresponding to the second direction. The first azimuthal angle of the first illumination beam 1010 and the second azimuthal angle of the second illumination beam 1020 may be different; e.g., opposing angles 180 degrees apart.

Depending on the structure of the metrology target 1060, the scattered radiation may comprise reflected radiation, diffracted radiation or transmitted radiation. In this embodiment, the metrology target may be a diffraction-based overlay target; and each illumination beam may correspond to a scattered beam comprising at least one non-zeroth diffraction order. Each scattered beam carries information of the illuminated metrology target. For example, the first illumination beam 1010 may correspond to the first scattered beam 1011 comprising the positive first diffraction order $+1^{st}$ DF; the second illumination beam 1020 may correspond to the second scattered beam 1021 comprising the negative first diffraction order $-1^{st}$ DF. The zeroth diffraction order and other undesired diffraction orders may either be blocked by a beam blocking element (not shown) or configured to completely fall outside the NA of the objective lens 1070. As a result, the df-DHM may be operated in a dark field mode. Note that, in some embodiments, one or more optical elements, e.g., a lens combination, may be used to achieve same optical effect of the objective lens 1070.

Due to the small size of the metrology target 1060, the imaging branch may have a net positive magnification (e.g., greater than 10×, greater than 20× or greater than or equal to 30×).

Both scattered beams 1011, 1021 may be collected by objective lens 1070 and subsequently re-focused onto an image sensor 1080. Note that the objective lens 1070 of the imaging branch may be an imaging objective lens used only in the detection path (as shown) and not used for illuminating (e.g., focusing the illumination onto the metrology target 1060). As such, the illumination does not necessarily have to go through the same objective as the scattered light. In other embodiments, the objective lens may be shared between the imaging and illumination branch to collect the scattered radiation and focus the illumination onto the metrology target 1060.

It is desirable to collect as much of the scattered/diffracted light as possible, and as such a high NA detection path or imaging branch is desirable. High NA in this regard may be greater than 0.1, greater than 0.2, greater than 0.3 or greater than 0.4 for example In other embodiments, high NA may refer to an NA of 0.8 or larger.

Objective lens 1070 may comprise multiple lenses, and/or df-DHM 1000 may comprise a lens system having two or more lenses, e.g., an objective lens and an imaging lens similar to the exemplary df-DHG of FIG. 9, thereby defining a pupil plane of the objective lens between the two lenses and an image plane at the focus of the imaging lens. In this embodiment, a portion 1012 of the first scattered beam 1011 and a portion 1022 of the second scattered beam 1021 are simultaneously incident at a common position of the image sensor 1080. At the same time, two reference beams of radiation, i.e. a first reference beam 1030 and a second reference beam 1040, are incident on the same position of the image sensor 1080. Such four beams may be grouped into two pairs of scattered radiation and reference radiation. For example, the first scattered-reference beam pair may comprise the portion 1012 of the first scattered beam 1011 and the first reference beam 1030. Likewise, the portion 1022 of the second scattered-reference beam pair may comprise the second scattered beam 1021 and the second reference beam 1040. These two scattered-reference beam pairs may subsequently form two interference patterns (holographic images) which at least partially overlap in spatial domain.

In an embodiment, in order to separate the two at least partially, spatially overlapping interference patterns (e.g., in the spatial frequency domain), the first reference beam 1030 may have a first angle of incidence with respect to the optical axis OA and the second reference beam 1040 may have a second angle of incidence with respect to the optical axis OA; the first angle of incidence and the second angle of incidence being different. Alternatively or in addition, the first reference beam 1030 may have a first azimuthal angle with respect to the optical axis OA and the second reference beam 1040 may have a second azimuthal angle with respect to the optical axis OA; the first and second azimuthal angles being different.

In order to generate an interference pattern, the two beams of each scattered-reference beam pair should be at least partially coherent to each other, to a degree which is sufficient to form an interference pattern. Note that each scattered radiation beam may have a phase offset with respect to its corresponding illumination radiation. For example, at the image plane of the image sensor 1080, such a phase offset may comprise contributions due to the optical path-length (OPD) from the metrology target 1060 to the image sensor 1080, and by the interaction with the metrology target. As described above, it is necessary to control the coherence between the first scattered-reference beam pair and the second scattered-reference beam pair such that each beam of one pair is incoherent to any beam of the other pair. In other words, interference should only occur between the beams within the same beam pair and suppressed between different beam pairs. In such a manner, only desired interference patterns, e.g., the two interference patterns formed by respect scattered-reference beam pairs, are formed in a superimposed manner on the image sensor 1080, thus obviating the problem of separating or removing undesired interference patterns.

More specifically, the coherence between the beams within the same beam pair should be temporal and spatial coherence. The mutual coherence function between these beams depends on space and time. A typical approximation is to factorize this function into spatial and temporal components. However, when the beams are traveling under angles (e.g., in an off-axis system), this approximation is no longer ideal. There should be sufficient coherence such that the object beam and the reference beam interfere on the camera. For the simplification of temporal and spatial coherence, this means that on the camera every point has the same optical path length (e.g., within the "temporal coherence" length) from the source. For limited spatial coherence, every point of the reference beam also should map to a corresponding point of the object beam (this may mean that both the object and the reference arm should make an image of the beamsplitter on the camera. Where single mode optical fibers are used, the spatial coherence may be very large.

In addition to being spatially and temporally coherent with the reference beam (of the same beam pair), each object beam may be smooth (e.g., uniformly irradiated) over the full area of the overlay target.

Figure 11:
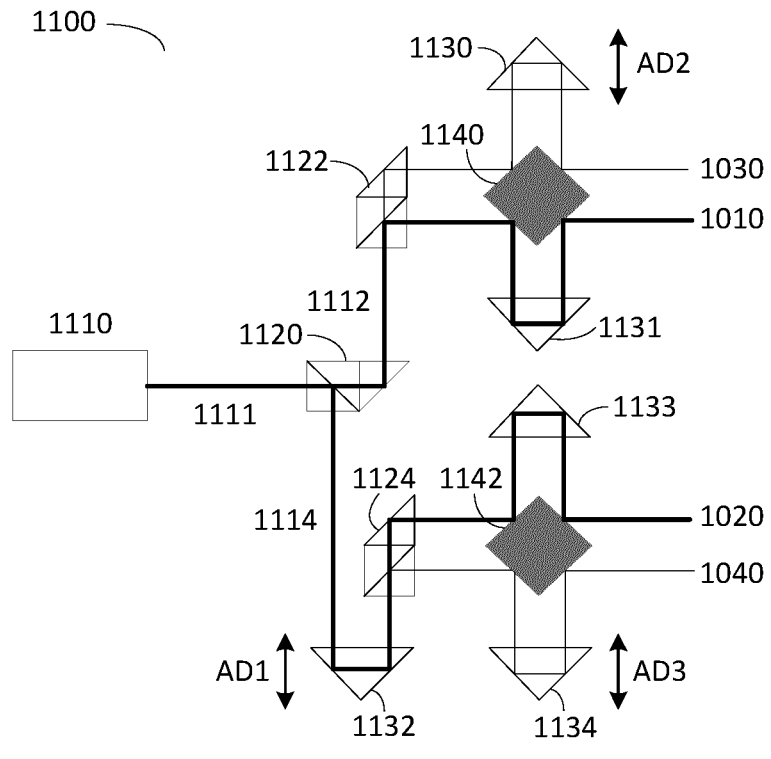
FIG. 11 depicts schematically an illumination device capable of providing multiple beams of radiation, in accordance with an embodiment.

In an embodiment, both illumination beams 1010, 1020 and both reference beams 1030, 1040 used in the df-DHM of FIG. 10 may be provided by an illumination branch comprising an illumination device. FIG. 11 schematically illustrates an illumination device in accordance with an embodiment. As shown in FIG. 11, a light source 1110 may emit a main beam of radiation 1111 that is at least partially coherent. The main beam of radiation 1111 may comprise wavelengths in the range from soft x-ray and visible to near-IR. The main beam of radiation 1111 may be split by a first beam splitter 1120 into two beams, i.e. a first beam of radiation 1112 and a second beam of radiation 1114. In this embodiment, the first beam splitter 1120 may comprise a 50/50 split ratio and thereby the first beam of radiation 1112 and the second beam of radiation 1114 may have a substantively same power level. Subsequently, the two beams 1112, 1114 may respectively follow two different beam paths.

In one of the beam paths 1112, 1114, in the example shown here the second beam path although this is largely arbitrary, the second beam of radiation 1114 (or first beam 1112) may subject to a delay. In the example shown here, the delay is implemented via an incoherence delay arrangement, such as an adjustable optical delay line AD1 comprising a prism 1132. The adjustable optical delay line AD1, or more generally the delay, may be used to control OPD (or coherence) between the beams in the first beam path and the beams in the second beam path. This can be done to ensure that these beams are not coherent such that the first beam pair does not interfere with the second beam pair. Instead of this delay line, a "hard" path difference may be deliberately introduced between the beam paths 1112, 1114.

In an embodiment, the adjustable optical delay line AD1 may be operable such that the time delay between the two paths may be maintained as short as possible in order to have similar intensity fluctuations in both beams, while still imposing incoherence.

In a first beam path, the first beam of radiation 1112 may enter a second beam splitter 1122 which may split the first beam of radiation 1112 into another two beams, i.e. a first illumination beam 1010 and a first reference beam 1030. Depending on the split ratio of the second beam splitter 1122, the first illumination beam 1010 and the first reference beam 1030 may have different powers. The split ratio of the second beam splitter 1122 may be 90/10, 80/20, 70/30, 60/40, or 50/50. In this embodiment, the power of the first illumination beam 1010 may be higher than that of the first reference beam 1030. Each of the two beams 1010, 1030 may then be reflected by a reflecting element 1140 into an optical delay line. Each optical delay line, being fixed or adjustable, may comprise a reflective optical element to retro-reflect incoming radiation. The reflective optical element may be a right-angle prism 1130 or 1131. In some embodiments, the reflective optical element may be a pair of reflective mirrors. In this embodiment, the first illumination beam 1010 may go through a fixed optical delay line comprising the prism 1131 while the first reference beam 1030 may go through an adjustable optical delay line AD2 comprising a prism 1130. In a different embodiment, the first illumination beam 1010 may go through an adjustable optical delay line comprising the prism 1130 while the first reference beam 1030 may go through a fixed optical delay line comprising the prism 1131. In either of these two scenarios, relative OPD between the two beams 1010, 1030 can be adjustable. The two beams 1010, 1030 form a first pair of output beams. Note that this is only one example of an adjustable path-length arrangement for enabling adjustment of an OPD between beams 1010, 1030. Any other suitable arrangement for achieving this can be used instead.

The second beam of radiation 1114 may be split by a third beam splitter 1124 into two beams, e.g., a second illumination beam 1020 and a second reference beam 1040. Depending on the split ratio of the third beam splitter 1124, the two beams may have different powers. In this embodiment, the split ratio of the third beam splitter 1124 may be same as that of the second beam splitter 1122 such that the first illumination beam 1010 and the second illumination beam 1020 may have a substantially same power level and the first reference beam 1020 and the second reference beam 1040 may have a substantially same power level. In this embodiment, the power of the second illumination beam 1020 may be higher than that of the second reference beam 1040. The two beams 1020, 1040 may then be reflected respectively by a reflecting element 1142 into two optical delay lines, one being fixed and the other being adjustable. In this embodiment, the second illumination beam 1020 may go through a fixed optical delay line comprising a prism 1133 while the second reference beam 1040 may go through an adjustable optical delay line AD3 comprising a prism 1134. In a different embodiment, the second illumination beam 1020 may go through an adjustable optical delay line comprising 1134 while the second reference beam 1040 may go through a fixed optical delay line comprising 1133. In either of these two scenarios, relative OPD between the two beams 1020, 1040 can be adjustable. The two beams 1020, 1040 form the second pair of output beams. Note that this is only one example of an adjustable path-length arrangement for enabling adjustment of an optical path-length between beams 1020, 1040. Any other suitable arrangement for achieving this can be used instead.

After exiting their respective optical delay lines, the four radiation beams, i.e. the first illumination beam 1010, the first reference beam 1030, the second illumination beam 1020, and the second reference beam 1040, may exit the illumination device 1100 and may be used as illumination and reference beams in a df-DHM, e.g., the corresponding beams of the df-DHM of FIG. 10. In an embodiment, before exiting the illumination device 1100, some or all of these four beams may respectively pass through additional optical elements, such as optical beam shaping elements, optical steering mirrors, optical polarization elements and optical power controlling elements, such that beam parameters, propagation direction, polarization state and/or optical power of each beam can be independently controlled. The beam parameters may comprise beam shape, beam diameter, and beam divergence. In an embodiment, the two beams of either of the first pair of output beams and the second pair of output beams may have different power levels. One beam of the first pair of output beams may have a substantially same power level as one beam of the second pair of output beams.

The propagation direction of a beam of radiation exiting from the illuminator of FIG. 11 determines the incident angle and the azimuthal angle of the beam with respect to the optical axis OA of the df-DHM of FIG. 10. The orientation of the Cartesian frame of reference is shown on the top of FIG. 10. The incident angle of a beam refers to the angle in the x-z plane between the optical axis (dashed line) of the microscope or the z-axis and the incident beam or its projection in the x-z plane. The azimuthal angle of a beam refers to the angle between the x-axis and the incident beam or its projection in the x-y plane.

Correspondingly, the relative OPD between the first illumination beam 1010 and the first reference beam 1030 can be adjusted using the optical delay line AD2 while the relative OPD between the second illumination beam 1020 and the second reference beam 1040 can be adjusted using the third optical delay line AD3. As long as the relative OPD induced phase delay is sufficient to cover the phase offset between each illumination beam of radiation and its associated scattered beam of radiation, coherence between each scattered beam radiation, e.g. the first scattered beam 1011 or the second scattered beam 1021, and its paired reference beam radiation e.g., the first reference beam 1030 or the second reference beam 1040, can be independently controlled or optimized. In addition, the adjustable optical delay line AD1 may be used to deliberately add a sufficient phase delay between the two illumination-reference beam pairs or two scattered-reference beam pairs (e.g., the first scattered-reference beam pair comprising the portion 1012 of the first scattered beam 1011 and the first reference beam 1030; the second scattered-reference beam pair comprising the portion 1022 of the second scattered beam 1021 and the second reference beam 1040) such that any beam of one beam pair is incoherent with any beam of the other beam pair. In this way, only two desired interference patterns are formed respectively by two scattered-reference beam pairs on the image sensor 1080.

Figure 12:
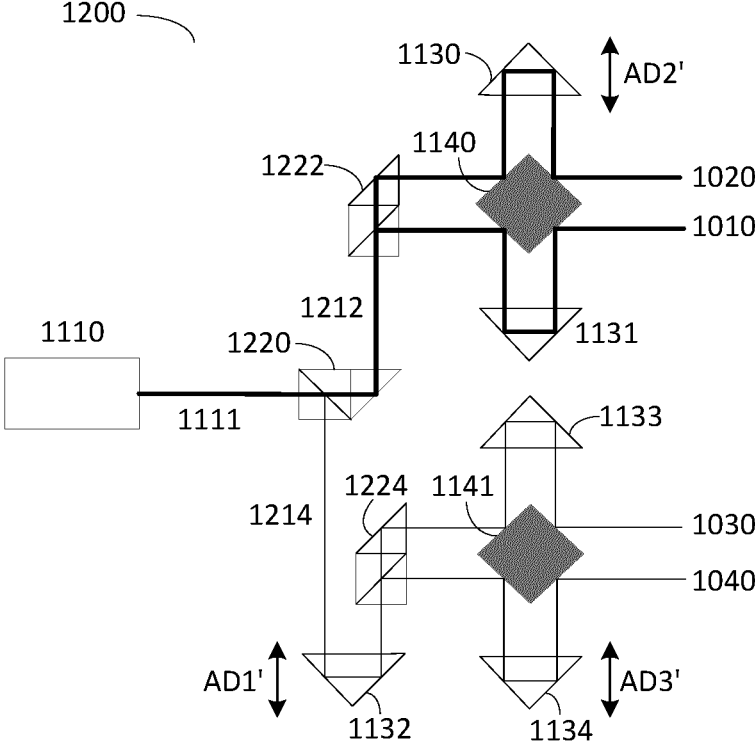
FIG. 12 depicts schematically an illumination device capable of providing multiple beams of radiation, in accordance with a different embodiment.

FIG. 12 schematically illustrates an illumination device 1200 in accordance with a different embodiment. The illumination device of FIG. 12 is similar to that of FIG. 11. The main difference is that in the embodiment of FIG. 12, the three beam splitters 1220, 1222, 1224 may have different split ratios as compared to their respective counterparts in the embodiment of FIG. 11. A consequence of using different split ratios may be that some or all of the four beams of radiation 1010, 1020, 1030, 1040 output from the device may have different powers as compared to their respective positional counterparts in the embodiment of FIG. 11. For example, in this embodiment the two beams 1010, 1020 output from the top branch (from beamsplitter 1222) have mutually similar powers, and similarly for the two beams 1030, 1040 output from the bottom branch (from beamsplitter 1224), with the powers of the pair of beams 1010, 1020 being different to that of pair of beams 1030, 1040. As such, in this embodiment, the first and second illumination beams 1010, 1020 may be output as a pair via beamsplitter 1222 and the first and second reference beams 1030, 1040 may be output as a pair via beamsplitter 1224.

As such, FIG. 11 shows an arrangement where the first output branch (via beamsplitter 1122) comprises a first beam pair branch (e.g., +1 diffraction order illumination and +1 reference beams) and the second output branch (via beam-splitter 1124) comprises a second beam pair branch (e.g., −1 diffraction order illumination and −1 reference beams). By contrast, in FIG. 12, the first output branch is an illumination branch (e.g., +1 diffraction order and 1 diffraction order illumination beams) and the second output branch is a reference branch (e.g., +1 diffraction order and 1 diffraction order reference beams.

Regardless of different beam combinations, the three adjustable optical delay lines AD1', AD2', AD3' may provide sufficient coherence (or OPD) control over all four beams such that only desired interference patterns are formed on the image sensor 1080 of FIG. 10. In an embodiment, the delay line AD3' of the reference arm may be significantly longer (10s of mm) than the delay line AD2' of the illumination arm.

In the arrangement of FIG. 11, therefore, the adjustable optical delay line AD1 may implement an incoherence delay arrangement operable to impose a delay on one of the first branch or the second branch with respect to the other of the first branch or the second branch; and adjustable optical delay lines AD2, AD3 implement a coherence matching arrangement for coherence matching of the beams within each beam pair. By contrast, in the arrangement of FIG. 12, the coherence matching arrangement and incoherence delay arrangement may be implemented together via co-optimization between adjustable optical delay line AD1 and the adjustable optical delay lines AD2, AD3. Note in the latter case, the optimization will be different if prism 1131 is adjustable rather than prism 1130 or if prism 1133 is adjustable rather than prism 1134.

The characteristic of the structure of the metrology target 1060 is determined by a processing unit 1090 of the metrology apparatus. The processing unit 1090 uses the first interference pattern and the second interference pattern recorded by the image sensor 1080 to determine the characteristic of the structure of the metrology target 1060. In an embodiment, the processing unit 1090 is coupled to the image sensor 1080 to receive a signal comprising information about the first interference pattern and the second interference pattern recorded by the sensor 1090. In an embodiment, the processing unit 1090 corrects for aberrations of the objective lens 1070 of the df-DHM 1000. In an embodiment, the measurements of the first interference pattern and the second interference pattern are performed with radiation simultaneously in time (in parallel) and the processing unit 1090 is configured to use the measurements simultaneously in time (in parallel) to determine the characteristic of the structure of the metrology target 1060 on the substrate 1050.

In an embodiment, the processing unit 1090 uses the first interference pattern to calculate a complex field of radiation at the sensor 1080 ("complex" here meaning that both amplitude and phase information is present) associated with the portion 1012 of the first scattered radiation 1011. Similarly, the processing unit 1090 uses the second interference pattern to calculate a complex field of radiation at the sensor 1080 associated with the portion 1022 of the second scattered radiation 1021. Such calculation of a complex field of radiation from an interference pattern formed by interfering reference radiation with radiation scattered from an object is known in general terms from holography. Further details about how to perform such calculations in the context of metrology for lithography may be found for example in US2016/0061750A1, which is hereby incorporated by reference.

If the optical characteristics of the df-DHM 1000 are known, it is possible to mathematically and computationally back-propagate each of the calculated complex fields to obtain the corresponding complex fields of the first scattered radiation 1011 and the second scattered radiation 1021 at the metrology target 1060.

Having knowledge of the complex field provides additional information for determining the characteristic of the metrology target 1060 on the substrate 1050, relative to alternative modes in which phase and amplitude information are not both available. For example, in European patent application EP18158745.2, filed on Feb. 27, 2018, it has been disclosed how phase information of the scattered radiation can be used to determine overlay errors between structures of different layers on the substrate (an example of a characteristic of the structure to be determined). European patent application EP18158745.2 is hereby incorporated by reference.

In an embodiment, the characteristic of the structure of the metrology target 1060 is determined by comparing the first interference pattern and the second interference pattern. In an embodiment, the characteristic of the structure is determined based on a difference between the first interference pattern and the second interference pattern. The difference between the first interference pattern and the second interference pattern may, for example, contain information about an asymmetry in the structure of the metrology target 1060. Obtaining information about asymmetry in the structure of the metrology target 1060 may provide information about overlay. In an embodiment, phase information obtained from the calculated complex fields is used to obtain overlay information, as described in EP18158745.2, filed Feb. 27, 2018. Overlay describes unwanted misalignment between different patterns in the metrology target 1060, such as patterns formed at different times, formed using different processes and/or formed in different layers. In other embodiments, the characteristic of the structure of the metrology target 1060 being determined may comprise an error indicative of an error in focus of radiation used in a lithographic process to manufacture the structure of the metrology target 1060. In still other embodiments, the characteristic of the structure of the metrology target 1060 being determined may comprise an error indicative of an error in radiation dose of radiation used in a lithographic process to manufacture the structure of the metrology target 1060.

It is important to minimize contributions, e.g., aforementioned unwanted interference patterns, to the difference between the first interference pattern and the second interference pattern that do not originate from the structure of the metrology target 1060. Through the use of three adjustable optical delay lines AD1, AD2, AD3, those contributions are effectively suppressed by applying sufficient coherence control over the four beams of radiation, i.e., the first scattered beam 1011, the first reference beam 1030, the second scattered beam 1021, the second reference beam 1040.

In order to accurately calculate the two complex fields, the two interference patterns should be completely separated from background stray light and/or residual zeroth diffraction order. Furthermore, to extract the target information from each interference pattern, the two overlaying interference patterns should also be separated. Complete separation of multiple overlaying interference patterns can be achieved by using spatial-frequency multiplexing. Such method has been described in detail in the US patent application US20180011022A1, incorporated herein by reference.

With spatial-frequency multiplexing, the processing unit 1090 subjects a recorded image comprising multiple overlaying interference patterns to a two-dimensional (2D) Fourier transform to obtain a Fourier transformed image. The lateral axis and the longitudinal axis of the resultant Fourier transformed image correspond respectively to two axes, i.e. fx and fy, in a spatial frequency coordinate system (fx, fy). In the resultant Fourier transformed image, there exist multiple spatial spectra, each of which corresponds to a part of the recorded image.

Figure 13:
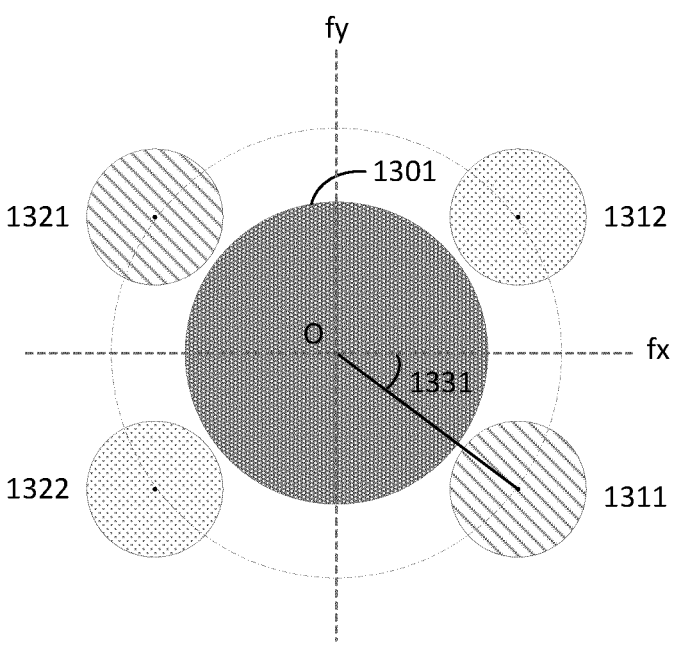
FIG. 13 depicts a Fourier transformed image in the spatial frequency domain.

FIG. 13 illustrates an exemplary 2D Fourier image in the spatial frequency domain obtained by subjecting a recorded image comprising two overlaying interference patterns to 2D Fourier transform. As shown in FIG. 13, the 2D Fourier image comprises five spatial spectra: a base spatial spectrum 1301 comprising zeroth order Fourier components, a first high order spatial spectrum 1311 corresponding to the first interference pattern formed with the portion 1012 of the first scattered beam of radiation 1011, a second high order spatial spectrum 1312 corresponding to the second interference pattern formed with the portion 1022 of the second scattered beam of radiation 1021, a first conjugate spatial spectrum 1321 conjugate to the first high order spatial spectrum 1311, a second conjugate spatial spectrum 1322 conjugate to the second high order spatial spectrum 1312.

The center of the base spectrum is the origin O of the spatial frequency coordinate. The position of the base spectrum is fixed. However, position of the high order spatial spectra and their conjugate spectra can be adjusted with respect to the base spectrum, by, for example, changing the incident angle and/or azimuthal angle of each reference beam. The radial distance between the center of each high order spatial spectrum and the center of the base spatial spectrum is related to the angle between the optical axis of the portion 1012 or 1022 of the scattered beam 1011 or 1021 and the optical axis of the reference beam 1030 or 1040. The larger the angle is the farther apart the high order spatial spectrum will be (with respect to the base spatial spectrum). Hence, by providing a sufficiently large angle between the axis of a portion of a scattered beam and the axis of a reference beam, the high order spatial spectrum 1311 or 1312 can be completely separated from the base spatial spectrum 1301. However, the angle of the reference beam cannot be arbitrarily high as an increase in angle between the optical axis of the portion 1012 or 1022 of the scattered beam 1011 or 1021 and the optical axis of the reference beam 1030 or 1040 results in a decrease in fringe spacing of the hologram fringes. Ultimately, the angle is limited by the pixel pitch of the image sensor 1080. The fringes in the hologram (or interference pattern) must be sampled adequately by the sensor pixels. The largest frequency in the hologram must fulfill the Nyquist criterion of sampling.

Moreover, the azimuthal angle of each reference beam has an impact on the circumferential position of a spatial spectrum with respect to the origin O. The circumferential position of a high order spatial spectrum is represented by an angle between the high order spatial spectrum and the spatial frequency axis fx. For example, the circumferential position of the first high order spatial spectrum is represented by the angle 1331. Hence, the high order spatial spectrums 1311, 1312 can be completely separated from each other by ensuring that the difference between the azimuthal angles of the two reference beams is sufficiently large.

Once separated, the processing unit 1090 extracts each high order spatial spectrum from the Fourier image and subsequently subjects the extracted high order spatial spectrum to inverse Fourier transform. Note that since both reference beams of radiation are provided directly by the illuminator 1100, information of the reference radiation, such as intensity distribution, at the image sensor 1080 can be determined either by calculation or by measurement.

Based on the results of the inverse Fourier transform and the information of the reference radiation, the complex field of the paired scattered radiation can be obtained, details of which are described below. Finally, the complex fields of the two scattered beams of radiation are used to determine a characteristic of the structure of the metrology target 1060 and/or to correct for optical aberrations of the objective lens 1070 of the df-DHM 1000.

With continued reference to FIG. 13, existing methods use only the high order spatial spectrum or the sideband (SB) 1311 or 1312 in the 2D Fourier image 1300 for determination of the amplitude and phase of the complex field of the portion 1012 or 1022 of the scattered beam 1011 or 1021. The information contained in the base spatial spectrum or the central band (CB) 1301 is completely discarded in the determination process. As such, the existing methods are prone to noise limitations, e.g., low signal to noise ratio, thereby leading to a loss in throughput. In accordance with a different aspect of the present embodiments, there is provided a method that improves on the existing methods by offering a better and more accurate way for determination of the amplitude and phase of the complex field of the scattered radiation at the image sensor. This is realized by taking account of the information contained in both the CB 1301 and the SB 1311 or 1312.

It is to be noted that another term for the Fourier Image of FIG. 13 is often termed the Fourier representation of the hologram. The four image of FIG. 13 is obtained by transforming the hologram into its Fourier representation or Fourier spectrum in the spatial frequency domain via a (2d) Fourier transformation.

Figure 14:
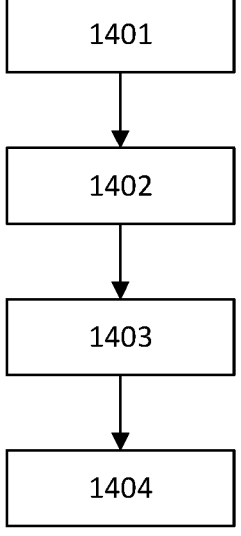
FIG. 14 depicts a flowchart of a method for determination of amplitude and phase of a complex field, in accordance with another different embodiment.

FIG. 14 shows a flowchart of the method for determination of the amplitude and phase of the complex field in accordance with an embodiment (e.g., which may be performed by processing unit 1090 or otherwise). With reference to FIG. 14, at step 1401, a hologram (or an interference pattern) may be generated after illumination of an object or target, and subsequently transformed into its Fourier representation or Fourier spectrum in the spatial frequency domain via Fourier transform. This Fourier representation has the advantageous property that the CB and the respective SBs are spatially separated in case the tilt angle of the reference wave used in the hologram is large enough considering the spatial frequency content of the SB. It should be noted further that in FIG. 13, the SBs appear in pairs, with one pair comprising SBs 1311 and 1321, and the other pair comprising SBs 1312 and 1322. Per SB pair, the two SBs carry identical information, since they are each other's complex conjugate, such that selection of one SB per SB pair is sufficient. At step 1402, the CB in the Fourier representation may be selected and subsequently used to calculate the corresponding component in the image plane via inverse Fourier transform of the selected CB. At step 1403, one or more separate SBs may be selected in the Fourier representation and each of the selected SBs may be used to calculate the corresponding component in the image plane via inverse Fourier transform of the selected SB; at step 1404, the amplitude and/or phase of the complex field may be determined based on the calculated CB and SB components in the image plane. Details of the implementation of the method are described below.

Note that the embodiment of FIG. 14 is only a non-limiting example, other embodiments may comprise more or fewer steps determined by specific requirements. For example, some embodiments may additionally include the step of illumination of an object or target and may use it as the first step; some other embodiments may combine the steps 1402 and 1403 into a single step such that inverse Fourier transform of the CB and inverse Fourier transform of the SB can be performed in parallel rather than sequentially in time.

In the cases where a single interference pattern is sufficient, one of the illumination-reference beam pairs provided by the illumination device 1100 or 1200 may be used to illuminate the target 1060. Subsequently, at step 1401, the scattered radiation from the object or target together with the reference radiation provided from the illumination-reference beam pair form the desired single interference pattern. Such a single interference pattern may be transformed to a 2D Fourier representation in the spatial frequency domain via Fourier transform. In this case, the 2D Fourier representation (not shown) may comprise one CB and one pair of mutually conjugated SBs. The mutual tilt angle of the respective beams of the scattered-reference beam pair may be arranged such that the resultant CB and SB are not overlapped in the spatial frequency domain. Then, at step 1402, the CB in the Fourier representation may be selected and used to calculate its corresponding component (i.e. $CB_{exp}(R)$ as described below) in the image plane via inverse Fourier transform. Following that, at step 1403, one of the mutually conjugated SBs in the Fourier representation may be selected and used to calculate its corresponding component (i.e. $SB_{exp}(R)$ as described below) in the image plane via inverse Fourier transform. Finally, at step 1404, based on the calculated information (i.e. $CB_{exp}(R)$ and $SB_{exp}(R)$ as described below), the amplitude and phase of the complex field of the scattered radiation from the object or target may be determined. The step 1404 is further explained by the following mathematical description.

In the following mathematical description, inverse Fourier transform is applied separately to the CB and the SB, and the corresponding components in the image plane are respectively denoted by the real valued function CB (R) and the complex-valued function SB (R), with R being the 2D coordinate in the image plane. Note that the CB contains both the auto-correlation of the scattered beam and the autocorrelation of the reference beam. The power of the reference beam is given by:

$$|\phi_{ref}(R)|^2. \qquad [1]$$

The complex-valued field in the image plane is denoted by $\phi_p(R)$ which equals the convolution of the sample field $\phi(R)$ (the field scattered from the sample/target) with the point spread function of the imaging optics (e.g., the objective lens 1070), denoted by p(R), that is:

$$\phi_p(R) = \phi(R) * p(R). \qquad [2]$$

The complex-valued field in the image-plane $\phi_p(R)$ can be expressed in terms of the amplitude A(R) and the phase $\varphi(R)$ as:

$$\phi_p(R) = A(R)e^{i\varphi(R)}. \qquad [3]$$

The hologram H(R) or the interference pattern is modelled as:

$$H(R) = \left|(1-s)A(R)e^{i\varphi(R)} + s\,e^{2\pi iK.R}\right|^2, \qquad [4]$$

where K denotes the wave-vector of the reference wave, and s denotes the amplitude of the reference wave $$|\phi_{ref}(R)|, \text{ i.e. } s = |\phi_{ref}(R)|.$$

The least-squares function for the estimation of amplitude and phase of the complex-valued field can be defined as:

$$S^2 = \int dR(H_{mod}(R) - H_{exp}(R))^2, \qquad [5]$$

The above least-squares function can conveniently be rewritten on the basis of Parseval's theorem and of the fact that CB and SBs are well separated in the Fourier representation. After incorporating respective contributions from the CB and the two conjugated SBs which are separable from the CB, the above equation can be more explicitly expressed as:

$$S^2 = \int dR(s^2 + (1-s)^2 A(R)^2 - CB_{exp}(R))^2 + \qquad [6]$$

$$2\int dR\left|s(1-s)A(R)e^{i\varphi(R)} - SB_{exp}(R)\right|^2,$$

where $CB_{exp}(R)$ and $SB_{exp}(R)$ denote respectively the CB and SB components in the image plane as derived from the experimentally measured hologram, and the modelled CB and SB components, i.e.

$CB_{mod}(R)$ and $SB_{mod}(R)$, are expressed as:

$$CB_{mod}(R) = s^2 + (1-s)^2 A(R)^2, \qquad [7]$$

And $$SB_{mod}(R) = s(1-s)\phi_p(R) = s(1-s)A(R)e^{i\varphi(R)}. \qquad [8]$$

for the sake of simplicity to $CB_{exp}(R)$ and $SB_{exp}(R)$ will be referred to as the experimentally measured CB and SB components.

Parameter-fitting for the amplitude A (R) and the phase $\varphi(R)$ is obtained via the respective derivatives of $S^2$, i.e. equation [6]:

$$\frac{\partial S^2}{\partial A} = 0, \qquad [9]$$

$$\frac{\partial S^2}{\partial \varphi} = 0. \qquad [10]$$

The latter derivative of $S^2$, i.e. equation [10], yields (for a specific value of R):

$$0 = \left[s(1-s)A(R) - SB_{exp}(R)e^{-i\varphi(R)}\right] - \left[s(1-s)A(R) - SB^*_{exp}(R)e^{i\varphi(R)}\right], \qquad [11]$$

from which the phase φ(R) of the complex field can be estimated as:

$$e^{i\varphi} = \sqrt{\frac{SB_{exp}}{SB^*_{exp}}}. \qquad [12]$$

Since the phase φ(R) can only be measured from the sideband, its estimate does not depend on the factor s or the amplitude of the reference beam $|\phi_{ref}(R)|$. However, for the optimal signal-to-noise ratio in the sidebands, the value of s may be chosen as s=0.5.

The former derivative of $S^2$, i.e. equation [9], yields (for any value of the position in the image plane R):

$$0 = A(R)(1-s)^2\left(s^2 + (1-s)^2 A(R)^2 - CB_{exp}(R)\right) + \qquad [13]$$

$$s(1-s)\left(s(1-s)A(R) - \sqrt{SB_{exp}(R)SB^*_{exp}(R)}\right).$$

The above relation can be simplified into (omitting the explicit R dependence):

$$0 = A\left[(1-s)^2 A^2 - (CB_{exp} - s^2)\right] + \frac{s}{1-s}\left[s(1-s)A - \sqrt{SB_{exp}SB^*_{exp}}\right]. \qquad [14]$$

In this relation, the first term relates to the CB, and the second term relates to the SB. For the following line of reasoning, the solution for the amplitude for each of these two terms can be obtained separately, which yields as the respective estimates for the amplitude at the CB:

$$\hat{A}_{CB} = \sqrt{\frac{CB_{exp} - s^2}{(1-s)^2}}, \qquad [15]$$

and at the SB:

$$\hat{A}_{SB} = \sqrt{\frac{SB_{exp}SB^*_{exp}}{s(1-s)}}, \qquad [16]$$

where the ^ indicates the estimate.

With the such two expressions, i.e. equations [15] and [16], the equation [14] resulting from the derivative of $S^2$ with respect to A can be simplified into:

$$0 = (1-s)^2 A\left[A^2 - \hat{A}_{CB}^2\right] + s^2\left[A - \hat{A}_{SB}\right]. \qquad [17]$$

The true solution (positive and real-valued) for the amplitude A at any image location R can be solved readily from the above cubic equation using standard mathematical approaches [17]. Some interesting properties for the true solution can be further derived. From the fact that A>0 and that 0<s<1, two regimes can be considered that are either:

$$\hat{A}_{CB} \geq A \text{ and } \hat{A}_{SB} \leq A, \qquad [18]$$

or vice versa:

$$\vec{A_{CR}} \le A \text{ and } \widehat{A_{SB}} \ge A. \qquad [19]$$

Expressed differently, this also implies that either:

$$\widehat{A_{SB}} \le A \le \vec{A_{CR}}, \qquad [20]$$

or vice versa:

$$\vec{A_{CR}} \le A \le \widehat{A_{SB}} \qquad [21]$$

In situations where two (overlaying) interference patterns are desired, such as the operation described with respect to the embodiment of FIG. 10, both the illumination-reference beam pairs provided by the illumination device 1100 or 1200 may be used to illuminate the target 1060. As described above, the two (overlaying) interference patterns may be respectively formed by two pairs of scattered-reference beams Hence, the processing unit will need to determine the amplitude and phase for two complex fields, each corresponding to one scattered beam. In some embodiments, the processing unit 1070 may also take the above described four steps (i.e. 1401 to 1404 of FIG. 14) to complete the determination process. However, this time, the 2D Fourier representation may comprise the superposition of the two respective CBs on top of each other, and two pairs of mutually conjugated and well separated SBs (or a total of four SBs), such as the example Fourier representation of FIG. 13. Each pair of mutually conjugated SBs contains information of one of the two interference patterns. For example, a first pair of mutually conjugated SBs contains information of a first interference pattern formed by a first pair of scattered-reference beams; whereas a second pair of mutually conjugated SBs contains information of a second interference pattern formed by a second pair of scattered-reference beams. Both the scattered-reference beam pairs may be arranged such that the resultant CB and SBs are not overlapped in the spatial frequency domain.

After step 1401 where the capture image of interference patterns is Fourier transformed to the spatial frequency domain, at step 1402, the central area in the Fourier representation comprising the two overlapped respective CBs is selected and used to calculate its corresponding component, i.e. $CB_{exp}(R)$ in the image plane via inverse Fourier transform. It should be noted that, for the ease of notation, $CB_{exp}(R)$ represents here the superimposed CBs of the two respective scattered-reference beams pairs. The same notation will be used for the modelled version of this component. Subsequently, at step 1403, one of each pair of SBs in the Fourier representation is selected and used to calculate its corresponding component in the image plane via inverse Fourier transform. As a result, two image-plane components $SB_{1,exp}(R)$ and $SB_{2,exp}(R)$ with the indices '1' and '2' referring to two different interference patterns (or complex fields) may be obtained. Finally, at step 1404, based on the calculated information, e.g., $CB_{exp}(R)$, $SB_{1,exp}(R)$ and $SB_{2,exp}(R)$, the amplitude and phase of both complex fields may be determined. The step 1404 is further explained by the following mathematical description which is an extension of the foregoing mathematical description (equations [1] to [21]) for the case a single hologram or interference pattern.

In the following mathematical description, inverse Fourier transform is applied separately to the CB, e.g., 1301 of FIG. 13, and each of the two selected SBs, e.g., 1311 and 1312 of FIG. 13, in the Fourier image in order to obtain corresponding components in the image plane. Such image-plane components are respectively denoted by the real valued function CB(R) and the complex-valued functions $SB_1(R)$ and $SB_2(R)$, with R being the 2D coordinate in the image plane and the indices '1' and '2' referring to two different interference patterns (or complex fields). The multiplexed hologram H(R) is modelled as the incoherent superposition of the two separate holograms or interference patterns (with the indices "1" and "2" referring to two separate holograms), assuming, without loss of generality, the same splitting ratio s for both individual holograms:

$$H(R) = \qquad [22]$$
$$\left| (1-s)A_1(R)e^{i\varphi_1(R)} + se^{2\pi i K_1 R} \right|^2 + \left| (1-s)A_2(R)e^{i\varphi_2(R)} + se^{2\pi i K_2 R} \right|^2.$$

The Fourier transform of the above multiplexed hologram contains a single CB in the Fourier representation (which originates from the two individual CBs of the two respective scattered-reference beams pairs) and two separate SBs which are modelled as:

$$CB_{mod}(R) = s^2 + (1-s)^2 A_1(R)^2 + s^2 + (1-s)^2 A_2(R)^2, \qquad [23]$$

and $$SB_{1,mod}(R) = s(1-s)A_1(R)e^{i\varphi_1(R)}, \qquad [24]$$

$$SB_{2,mod}(R) = s(1-s)A_2(R)e^{i\varphi_2(R)}. \qquad [25]$$

The least-squares function to be minimized for the multiplexed hologram is:

$$S^2 = \int dR \big( 2s^2 + (1-s)^2 A_1(R)^2 + (1-s)^2 A_2(R)^2 - CB_{exp}(R) \big)^2 + \qquad [26]$$
$$2\int dR \big| s(1-s)A_1(R)e^{i\varphi_1(R)} - SB_{1,exp}(R) \big|^2 +$$
$$2\int dR \big| s(1-s)A_2(R)e^{i\varphi_2(R)} - SB_{2,exp}(R) \big|^2.$$

Optimization for the phases $\varphi_1(R)$ and $\varphi_2(R)$ involves taking derivative of $S^2$ with respect to each phase function $\varphi_1(R)$ or $\varphi_2(R)$ and thus is identical for that of a non-multiplexed (single) hologram, since the phase is only detectable in the respective SBs (and not in the CB where the overlap occurs for the two respective scattered-reference beams pairs). This means that the same solution will be derived for the phases as for the individual holograms (since their sidebands are separated in the Fourier space of the multiplexed hologram):

$$e^{i\hat{\varphi}_1} = \sqrt{\frac{SB_{1,exp}}{SB_{1,exp}^*}}, \text{ and} \qquad [27]$$

$$e^{i\hat{\varphi}_2} = \sqrt{\frac{SB_{2,exp}}{SB_{2,exp}^*}}. \qquad [28]$$

US 12,681,432 B2

29

Similarly, optimization for the amplitudes $A_1(R)$ and $A_2(R)$ involves taking derivative of $S^2$ with respect to each amplitude function $A_1(R)$ or $A_2(R)$ and yields the following two equations in $A_1(R)$ and $A_2(R)$:

$$0 = A_1(R)(1-s)\left(2s^2 + (1-s)^2 A_1(R)^2 + (1-s)^2 A_2(R)^2 - CB_{exp}(R)\right) + \quad [29]$$
$$s\left(s(1-s)A_1(R) - \sqrt{SB_{1,exp}(R)SB_{1,exp}^*(R)}\right),$$

$$0 = A_2(R)(1-s)\left(2s^2 + (1-s)^2 A_1(R)^2 + (1-s)^2 A_2(R)^2 - CB_{exp}(R)\right) + \quad [30]$$
$$s\left(s(1-s)A_2(R) - \sqrt{SB_{2,exp}(R)SB_{2,exp}^*(R)}\right).$$

Applying the relations $|SB_{1,exp}(R)| < \sqrt{SB_{1,exp}(R)SB_{1,exp}^*(R)}$ and $|SB_{2,exp}(R)| < \sqrt{SB_{2,exp}(R)SB_{2,exp}^*(R)}$, the above two equations [29] and [30], can be rewritten as:

$$s|SB_{1,exp}(R)| = \quad [31]$$
$$A_1(R)(1-s)\left(3s^2 + (1-s)^2 A_1(R)^2 + (1-s)^2 A_2(R)^2 - CB_{exp}(R)\right),$$

$$s|SB_{2,exp}(R)| = \quad [32]$$
$$A_2(R)(1-s)\left(3s^2 + (1-s)^2 A_1(R)^2 + (1-s)^2 A_2(R)^2 - CB_{exp}(R)\right).$$

The above set of equations can be solved via various strategies. Without loss of generality, one particular strategy is described here as an example of the implementation. By division of the two equations [31] and [32], the ratio of the two amplitudes is obtained:

$$\frac{A_1(R)}{A_2(R)} = \frac{|SB_{1,exp}(R)|}{|SB_{2,exp}(R)|}. \quad [33]$$

Applying equation [33] to equation [31] so as to remove $A_2(R)$, an equation with the sole unknown parameter $A_1(R)$ can be obtained (omitting the explicit R dependence):

$$s|SB_{1,exp}| = \quad [34]$$
$$A_1(1-s)\left(3s^2 + (1-s)^2 A_1^2 + (1-s)^2 A_1^2 \frac{|SB_{2,exp}|^2}{|SB_{1,exp}|^2 + \varepsilon} - CB_{exp}\right),$$

where $\varepsilon$ is a small positive value that avoids noise amplification in the region where the power in the SB signal is small. The true solution for the (positive and real-valued) amplitude $A_1$ of the first hologram contained in the multiplexed hologram at a specific image location R can be solved readily from the cubic equation [34]. The value for the amplitude $A_2$ of the second hologram contained in the multiplexed hologram can be derived subsequently from the relation of the ratio, i.e. equation [33].

Note that the aforementioned embodiments may be further generalized for df-DHMs having a plurality of pairs of illumination and reference radiation beams. In some embodiments, each of the plurality of illumination radiation beams may comprise a different azimuthal angle and/or a different angle of incidence. Likewise, each of the plurality of reference beams may comprise a different azimuthal angle and/or a different angle of incidence. For example, in an embodiment, in addition to the two illumination radiation beams 1010, 1020 that are predominantly lie in the x-z plane, another two illumination radiation beams (not shown) that are predominantly lie in the y-z plane may be used to illuminate the target 1060. Two additional reference radiation beams may also be used to pair respectively with the two additional illumination radiation beams. This may result in four at least partially, spatially overlapping interference patterns, each of which may correspond to a pair of illumination and reference radiation beams By properly configuring the azimuthal angle and/or angle of incidence of each additional reference radiation beam, the four at least partially, spatially overlapping interference patterns may be separable in the spatial frequency domain In such a manner, more information about structure of the target, e.g., y-axis asymmetry in a structure of the target, may be obtained.

In some embodiments, the illumination device may provide a plurality of pairs of illumination radiation beams and reference radiation beams. The illumination device may also provide sufficient coherence control between radiation beams such that only desired interference patterns will be formed on the image sensor. The plurality of pairs of illumination radiation beams and reference radiation beams may result in formation of a plurality of mutually incoherent, spatially overlapping interference patterns. Hence, the multiplexed hologram H (R) can be modelled as the incoherent superposition of the plurality of separate holograms or interference patterns. The equation [22] for the case of two overlaying holograms can then be further extended to include the amplitude and phase functions of all the separate holograms. Accordingly, the hologram indices should be extended from '1, 2' to '1, 2, 3 . . . and n' when n holograms are formed. Note that the determination process as illustrated in FIG. 14 should be equally applicable for any number of overlaying holograms, e.g., more than two overlaying holograms.

It should also be noted that different embodiments of the method for determination of amplitude and phase of one or more complex fields, e.g., the embodiment of FIG. 14, can be used either in combination with or independently of the embodiments of FIGS. 10 to 12. When used independently, other types of df-DHM may be used to generate holograms or interference patterns.

In an embodiment, the processing unit 1090 may be a computer system. The computer system may be equipped with an image reconstruction algorithm which is used to perform all the aforementioned tasks, comprising performing Fourier transform, extracting each individual high order spatial spectrum, performing inverse Fourier transform, calculating complex fields and determining a characteristic of the structure based on the results.

Figure 15:
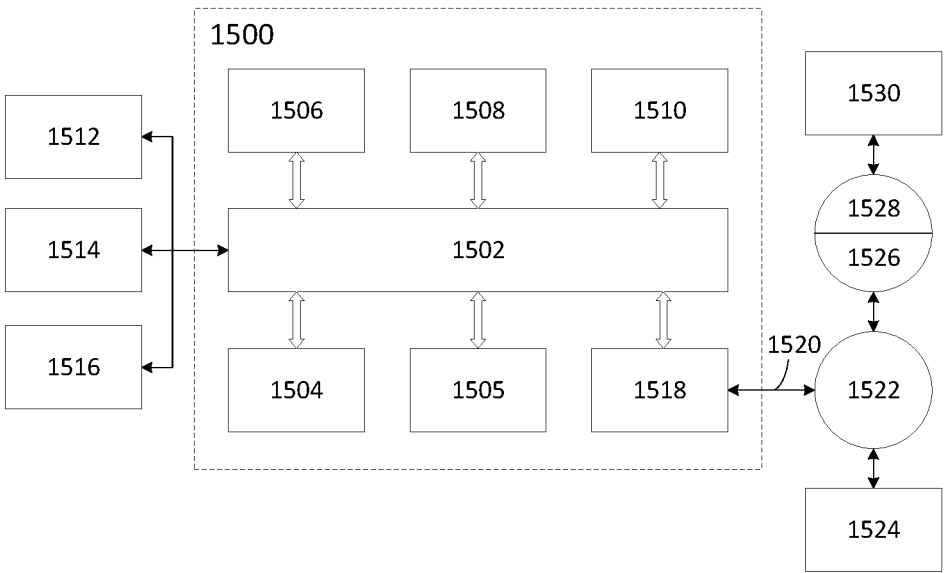
FIG. 15 depicts a block diagram of a computer system for controlling a dark field digital holographic microscope.

FIG. 15 is a block diagram that illustrates a computer system 1500 that may assist in implementing the methods and flows disclosed herein. Computer system 1500 includes a bus 1502 or other communication mechanism for communicating information, and a processor 1504 (or multiple processors 1504 and 1505) coupled with bus 1502 for processing information. Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT) or flat panel or touch panel display for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane. A touch panel (screen) display may also be used as an input device.

One or more of the methods as described herein may be performed by computer system 1500 in response to processor 1504 executing one or more sequences of one or more instructions contained in main memory 1506. Such instructions may be read into main memory 1506 from another computer-readable medium, such as storage device 1510. Execution of the sequences of instructions contained in main memory 1506 causes processor 1504 to perform the process steps described herein. One or more processors in a multiprocessing arrangement may also be employed to execute the sequences of instructions contained in main memory 1506. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 1504 for execution. Such a medium may take many forms, including but not limited to, non-volatile media, volatile media, and transmission media. Non-volatile media include, for example, optical or magnetic disks, such as storage device 1510. Volatile media include dynamic memory, such as main memory 1506. Transmission media include coaxial cables, copper wire and fiber optics, including the wires that comprise bus 1502. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1504 for execution. For example, the instructions may initially be borne on a magnetic disk of a remote computer. The remote computer can load the instructions into its dynamic memory and send the instructions over a telephone line using a modem. A modem local to computer system 1500 can receive the data on the telephone line and use an infrared transmitter to convert the data to an infrared signal. An infrared detector coupled to bus 1502 can receive the data carried in the infrared signal and place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also preferably includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the worldwide packet data communication network, now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are exemplary forms of carrier waves transporting the information.

Computer system 1500 may send messages and receive data, including program code, through the network(s), network link 1520, and communication interface 1518. In the Internet example, a server 1530 might transmit a requested code for an application program through Internet 1528, ISP 1526, local network 1522 and communication interface 1518. One such downloaded application may provide for one or more of the techniques described herein, for example. The received code may be executed by processor 1504 as it is received, and/or stored in storage device 1510, or other non-volatile storage for later execution. In this manner, computer system 1500 may obtain application code in the form of a carrier wave.

Further embodiments are disclosed in the subsequent numbered list of clauses:

1. A dark field digital holographic microscope configured to determine a characteristic of interest of a structure, comprising:

an illumination device configured to provide at least: a first beam pair comprising a first illumination beam of radiation and a first reference beam of radiation and a second beam pair comprising a second illumination beam of radiation and a second reference beam of radiation; and an imaging branch being operable at least to detect a first scattered radiation scattered by said structure resultant from said structure being illuminated by said first illumination beam of radiation; and to detect a second scattered radiation scattered by said structure resultant from said structure being illuminated by said second illumination beam of radiation, said imaging branch having a detection NA greater than 0.1, and optionally greater than 0.8;

wherein the illumination device is configured such that:

the first illumination beam of radiation and the first reference beam of radiation are at least partially temporally and spatially coherent;

the second illumination beam of radiation and the second reference beam of radiation are at least partially temporally and spatially coherent; and the illumination device is configured to impose temporal and/or spatial incoherence between the first beam pair and second beam pair.

2. A dark field digital holographic microscope as defined in clause 1, wherein the illumination device is operable to direct said first illumination beam of radiation so as to illuminate said structure from a first direction and to direct said second illumination beam of radiation so as to illuminate said structure from a second direction, said second direction being different to said first direction.

3. A dark field digital holographic microscope as defined in clause 1 or 2, wherein the imaging branch comprises a sensor, and the dark field digital holographic microscope is operable to simultaneously capture on said sensor an interference image comprising a first interference pattern resulting from interference of said first scattered radiation and first reference beam and a second interference pattern resulting from interference of said second scattered radiation and second reference beam.

4. A dark field digital holographic microscope as defined in clause 3, being operable such that said first interference pattern and second interference pattern at least partially, spatially overlap on said sensor.

5. A dark field digital holographic microscope as defined in clause 3 or 4, configured such that said first reference beam of radiation and said second reference beam of radiation are arranged to be each incident at respective different azimuthal angles with respect to an optical axis of said dark field digital holographic microscope.

6. A dark field digital holographic microscope as defined in clause 5, wherein said azimuthal angle of said first reference beam of radiation and said azimuthal angle of said second reference beam of radiation is configured to comprise a sufficient large difference such that two said interference patterns are separable in spatial frequency domain.

7. A dark field digital holographic microscope as defined in any of clauses 3 to 6, configured such that said first reference beam of radiation and said second reference beam of radiation are arranged to be each incident at respective different angles of incidence with respect to an optical axis of said dark field digital holographic microscope.

8. A dark field digital holographic microscope as defined in any of clauses 3 to 7, comprising a processor operable to:

transform said interference image of said first interference pattern and said second interference pattern to a Fourier representation, wherein said Fourier representation comprises a central band, and at least one pair of sidebands; and determine at least an amplitude of a complex field of at least one of said first scattered radiation and said second scattered radiation from said central band and at least one sideband of said at least one pair of sidebands.

9. A dark field digital holographic microscope as defined in clause 8, wherein said at least one pair of sidebands comprises:

a first pair of conjugated sidebands comprising first information relating to said first interference pattern of scattered-reference beams pair, and a second pair of conjugated sidebands comprising second information relating to said second interference pattern of scattered-reference beams pair.

10. A dark field digital holographic microscope as defined in clause 9, wherein the processor is operable to:

use said central band to calculate via inverse Fourier transform a first component in said interference image of said first interference pattern and said second interference pattern;

use said first sideband to calculate via inverse Fourier transform a second component in said interference image of said first interference pattern and said second interference pattern;

use said second sideband to calculate via inverse Fourier transform a third component in said interference image of said first interference pattern and said second interference pattern; and determine a first amplitude and a first phase of a first complex field of said first scattered radiation and determining a second amplitude and a second phase of a second complex field of said second scattered radiation from said first component, said second component and said third component of said interference image.

11. A dark field digital holographic microscope as defined in clause 10, wherein the processor is configured such that said determination of a first amplitude and a first phase of said complex field of said first scattered radiation and determination of a second amplitude and a second phase of said complex field of said second scattered radiation further comprises:

obtaining a modelled image of said first interference pattern and said second interference pattern, comprising a modelled first component, a modelled second component, and a modelled third component;

defining a performance function describing the matching of said interference image and said modelled image; and optimizing (e.g., minimizing) said performance function to obtain values for one or more of: said first phase, said second phase, said first amplitude and said second amplitude.

12. A dark field digital holographic microscope as defined in clause 11, wherein the processor is configured such that said optimization of said performance function further comprises:

fitting values for said first phase by taking a derivative of said performance function with respect to said first phase;

fitting values for said second phase by taking a derivative of said performance function with respect to said second phase;

fitting values for said first amplitude by taking a derivative of said performance function with respect to said first amplitude; and fitting values for said second amplitude by taking a derivative of said performance function with respect to said second amplitude.

13. A dark field digital holographic microscope as defined in any preceding clause, wherein the illumination device further comprises a coherence matching arrangement operable to adjustably delay one of the first illumination beam and first reference beam with respect to the other of the first illumination beam and first reference beam so as to maintain the beams of the first beam pair to be at least partially coherent and to adjustably delay one of the second illumination beam and second reference beam with respect to the other of the second illumination beam and second reference beam so as to maintain the beams of the second beam pair to be at least partially coherent.

14. A dark field digital holographic microscope as defined in clause 13, wherein the illumination device comprises an time delay arrangement configured to impose incoherence between the first beam pair and second beam pair by being operable to delay one of said first beam pair and second beam pair with respect to the other of said first beam pair and second beam pair.

15. A dark field digital holographic microscope as defined in clause 14, wherein the time delay arrangement comprises an adjustable time delay arrangement operable to adjustably delay one of said first beam pair and second beam pair with respect to the other of said first beam pair and second beam pair to impose said incoherence.

16. A dark field digital holographic microscope as defined in clause 14 or 15, wherein the illumination device comprises a first branch operable to provide said first pair of beams and a second branch operable to provide said second pair of beams and wherein:

said time delay arrangement comprises at least a delay line operable to impose a delay on one of the first branch or the second branch with respect to the other of the first branch or the second branch; and said coherence matching arrangement comprises a first coherence matching arrangement in the first branch operable to adjustably delay at least one of said first reference beam and first illumination beam, and a second coherence matching arrangement in the second branch operable to adjustably delay at least one of said second reference beam and second illumination beam.

17. A dark field digital holographic microscope as defined in clause 14 or 15, wherein the illumination device comprises a first branch operable to provide said first illumination beam and second illumination beam and a second branch operable to provide said first reference beam and second reference beam; wherein:

the coherence matching arrangement and time delay arrangement is implemented via co-optimization of at least a first adjustable delay line operable to impose an adjustable delay on one of the first branch or the second branch with respect to the other of the first branch or the second branch; a second adjustable delay line in the first branch operable to impose an adjustable delay on at least one of said first illumination beam and second illumination beam, and a third adjustable delay line in the second branch operable to impose an adjustable delay on at least one of said first reference beam and second reference beam.

18. A dark field digital holographic microscope as defined in any preceding clause, wherein said first illumination beam of radiation is configured to illuminate said structure at a first angle of incidence; said second illumination beam of radiation configured to illuminate said structure at a second angle of incidence, different to said first angle of incidence.

19. A dark field digital holographic microscope as defined in any preceding clause, wherein said illumination device comprises a single radiation source from which the illumination device is configured to generate the first beam pair and second beam pair.

20. A dark field digital holographic microscope as defined in clause 19, wherein said single light source configured to emit at least partially coherent radiation.

21. A dark field digital holographic microscope as defined in any preceding clause, wherein said illumination device is configured such that said first reference beam and second reference beam are each generated at a first power level and said first illumination beam and second illumination beam are each generated at a second power level, said second power level being greater than said first power level.

22. A dark field digital holographic microscope as defined in any preceding clause, further comprising: one or more optical elements operable to capture a first scattered radiation scattered by said structure resultant from said structure being illuminated by said first illumination beam of radiation; and to capture a second scattered radiation scattered by said structure resultant from said structure being illuminated by said second illumination beam of radiation.

23. A dark field digital holographic microscope as defined in any preceding clause, wherein the imaging branch further comprises an objective lens operable at least to capture said first scattered radiation and said second scattered radiation.

24. A dark field digital holographic microscope as defined in any preceding clause, wherein the imaging branch comprises a net positive magnification.

25. A dark field digital holographic microscope as defined in any preceding clause, wherein the illumination device is configured such that the first illumination beam and second illumination beam each comprise a smooth profile so as to substantially uniformly irradiate said structure.

26. A method of determining a characteristic of interest of a target formed by a lithographic process on a substrate, the method comprising:

illuminating said target with a first illumination beam of radiation and capturing resultant first scattered radiation, having been scattered from the target;

illuminating said target with a second illumination beam of radiation and capturing resultant second scattered radiation, having been scattered from the target;

imposing spatial and/or temporal incoherence between a first beam pair comprising said first illumination beam and said first reference beam and a second beam pair comprising said second illumination beam and said second reference beam, such that:

the beams of said first beam pair are at least partially spatially and temporally coherent, the beams of said second beam pair are at least partially spatially and temporally coherent, and any beam of said first beam pair is spatially and/or temporally incoherent to any beam of said second beam pair; and simultaneously generating a first interference pattern resulting from interference of said first scattered radiation and a first reference beam of radiation; and a second interference pattern resulting from interference of said second scattered radiation and a second reference beam.

27. A method as defined in clause 26, further comprising:

directing said first illumination beam of radiation to illuminate said target at a first angle of incidence and directing said second illumination beam of radiation to illuminate said target at a second angle of incidence, said first angle of incidence being different to said second angle of incidence.

28. A method as defined in any of clauses 26 or 27, further comprising:

directing said first illumination beam of radiation to illuminate said target at a first azimuthal angle and directing said second illumination beam of radiation to illuminate said target at a second azimuthal angle, said first azimuthal angle being different to said second azimuthal angle.

29. A method as defined in any of clauses 26 to 28, further comprising:

directing said first reference beam of radiation and said second reference beam of radiation to be each incident at respective different azimuthal angles with respect to an optical axis of said dark field digital holographic microscope.

30. A method as defined in clause 29, wherein said azimuthal angle of said first reference beam of radiation and said azimuthal angle of said second reference beam of radiation comprise a sufficient large difference such that two said interference patterns are separable in spatial frequency domain.

31. A method as defined in any of clauses 29 or 30, further comprising:

directing said first reference beam of radiation and said second reference beam of radiation to be each incident at respective different angles of incidence with respect to an optical axis of said dark field digital holographic microscope.

32. A method as defined in any of clauses 26 to 31, further comprising:

adjustably delaying one of the first illumination beam and first reference beam with respect to the other of the first illumination beam and first reference beam so as to maintain the beams of the first beam pair to be at least partially coherent and adjustably delaying one of the second illumination beam and second reference beam with respect to the other of the second illumination beam and second reference beam so as to maintain the beams of the second beam pair to be at least partially coherent.

33. A method as defined in clause 32, further comprising:

adjustably delaying one of said first beam pair and second beam pair with respect to the other of said first beam pair and said second beam pair so as to impose incoherence between the first beam pair and second beam pair.

34. A method as defined in any of clauses 26 to 33, further comprising:

generating said first beam pair comprising said first illumination beam of radiation and said first reference beam of radiation and said second beam pair comprising said second illumination beam of radiation and said second reference beam of radiation from a common radiation source.

35. A method as defined in any of clauses 26 to 34, further comprising:

setting said first reference beam and second reference beam to a first power level and setting said first illumination beam and second illumination beam to a second power level, said second power level being greater than said first power level.

36. A method as defined in any of clauses 26 to 35, comprising maintain a time delay to be as short as possible between the first beam pair and second beam pair when imposing said incoherence between said beam pairs.

37. A method as defined in any of clauses 26 to 36, further comprising:

imaging said first interference pattern and said second interference pattern such that said first interference pattern and second interference pattern at least partially spatially overlap, to obtain an interference image.

38. A method as defined in clause 37, comprising the further steps of:

transforming said interference image of said first interference pattern and said second interference pattern to a Fourier representation, wherein said Fourier representation comprising a central band, and at least one pair of sidebands; and determining at least an amplitude of a complex field of at least one of said first scattered radiation and said second scattered radiation from said central band and said at least one sideband of said at least one pair of sidebands.

39. A method as defined in clause 38, wherein said at least one pair of sidebands comprises:

a first pair of conjugated sidebands comprising first information relating to said first interference pattern, and a second pair of conjugated sidebands comprising second information relating to said second interference pattern.

40. A method as defined in clause 39, wherein the determining step further comprises:

using said central band to calculate via inverse Fourier transform a first component in said interference image of said first interference pattern and said second interference pattern;

using said first sideband to calculate via inverse Fourier transform a second component in said interference image of said first interference pattern and said second interference pattern;

using said second sideband to calculate via inverse Fourier transform a third component in said image of said first interference pattern and said second interference pattern; and determining a first amplitude and a first phase of a first complex field of said first scattered radiation and determining a second amplitude and a second phase of a second complex field of said second scattered radiation from said first component, said second component and said third component of said interference image.

41. A method as defined in clause 40, wherein each of said first pair of conjugated sidebands and said second pair of conjugated sidebands is separable from said central band and any other sideband.

42. A method as defined in clause 40 or 41, wherein said determination of a first amplitude and a first phase of said complex field of said first scattered radiation and determination of a second amplitude and a second phase of said complex field of said second scattered radiation further comprises:

obtaining a modelled image of said first interference pattern and said second interference pattern, comprising a modelled first component, a modelled second component, and a modelled third component;

defining a performance function describing the matching between said interference image and said modelled image; and optimizing (e.g., minimizing) said performance function to obtain values for one or more of: said first phase, said second phase, said first amplitude and said second amplitude.

43. A method as defined in clause 42, wherein said optimization of said performance function further comprises:

fitting values for said first phase by taking a derivative of said performance function with respect to said first phase;

fitting values for said second phase by taking a derivative of said performance function with respect to said second phase;

fitting values for said first amplitude by taking a derivative of said performance function with respect to said first amplitude;

fitting values for said second amplitude by taking a derivative of said performance function with respect to said second amplitude.

44. A metrology apparatus for determining a characteristic of interest of a structure on a substrate comprising a dark field digital holographic microscope as defined in any of clauses 1 to 22; or 52 to 56.

45. An inspection apparatus for inspecting a structure on a substrate comprising a dark field digital holographic microscope as defined in any of clauses 1 to 25; or 52 to 56.

46. A method of determining at least an amplitude of a complex field describing a structure, comprising:

illuminating said structure with a first illumination beam of radiation and capturing resultant first scattered radiation, having been scattered from the structure;

illuminating said structure with a second illumination beam of radiation and capturing resultant second scattered radiation, having been scattered from the structure;

imaging a first interference pattern resulting from interference of said first scattered radiation and a first reference beam of radiation; and a second interference pattern resulting from interference of said second scattered radiation and a second reference beam such that said first interference pattern and second interference pattern at least partially spatially overlap, to obtain an interference image;

transforming said interference image of said first interference pattern and said second interference pattern to a Fourier representation, wherein said Fourier representation comprising a central band, and at least one pair of sidebands; and determining at least an amplitude of a complex field of at least one of said first scattered radiation and said second scattered radiation from said central band and said at least one pair of sidebands.

47. A method as defined in clause 46, wherein said at least one pair of sidebands comprises:

a first pair of conjugated sidebands comprising first information relating to said first interference pattern, and a second pair of conjugated sidebands comprising second information relating to said second interference pattern.

48. A method as defined in clause 47, wherein the determining step further comprises:

using said central band to calculate via inverse Fourier transform a first component in said interference image of said first interference pattern and said second interference pattern;

using said first sideband to calculate via inverse Fourier transform a second component in said interference image of said first interference pattern and said second interference pattern;

using said second sideband to calculate via inverse Fourier transform a third component in said interference image of said first interference pattern and said second interference pattern; and determining a first amplitude and a first phase of a first complex field of said first scattered radiation and determining a second amplitude and a second phase of a second complex field of said second scattered radiation from said first component, said second component and said third component of said interference image.

49. A method as defined in clause 48, wherein each of said first pair of conjugated sidebands and said second pair of conjugated sidebands is separable from said central band and any other sideband.

50. A method as defined in clause 48 or 49, wherein said determination of a first amplitude and a first phase of said complex field of said first scattered radiation and determination of a second amplitude and a second phase of said complex field of said second scattered radiation further comprises:

obtaining a modelled image of said first interference pattern and said second interference pattern, comprising a modelled first component, a modelled second component, and a modelled third component;

defining a performance function describing the matching between said interference image and said modelled image; and optimizing (e.g., minimizing) said performance function to obtain values for one or more of: said first phase, said second phase, said first amplitude and said second amplitude.

51. A method as defined in clause 50, wherein said optimization of said performance function further comprises:

fitting values for said first phase by taking a derivative of said performance function with respect to said first phase;

fitting values for said second phase by taking a derivative of said performance function with respect to said second phase;

fitting values for said first amplitude by taking a derivative of said performance function with respect to said first amplitude;

fitting values for said second amplitude by taking a derivative of said performance function with respect to said second amplitude.

52. A dark field digital holographic microscope configured to determine a characteristic of interest of a structure, comprising:

an illumination device configured (e.g., simultaneously) to provide at least: a first beam pair comprising a first illumination beam of radiation and a first reference beam of radiation and a second beam pair comprising a second illumination beam of radiation and a second reference beam of radiation, such that said dark field digital holographic microscope is operable to (e.g., simultaneously) capture a first scattered radiation scattered by said structure resultant from said structure being illuminated by said first illumination beam of radiation; and to capture a second scattered radiation scattered by said structure resultant from said structure being illuminated by said second illumination beam of radiation;

a sensor operable to simultaneously capture an interference image comprising a first interference pattern resulting from interference of said first scattered radiation and first reference beam and a second interference pattern resulting from interference of said second scattered radiation and second reference beam; and a processor operable to:

transform said interference image of said first interference pattern and said second interference pattern to a Fourier representation, wherein said Fourier representation comprising a central band, and at least one pair of sidebands; and determine at least an amplitude of a complex field of at least one of said first scattered radiation and said second scattered radiation from said central band and said at least one pair of sidebands.

53. A dark field digital holographic microscope as defined in clause 52, wherein said at least one pair of sidebands comprises:

a first pair of conjugated sidebands comprising first information relating to said first interference pattern, and a second pair of conjugated sidebands comprising second information relating to said second interference pattern.

54. A dark field digital holographic microscope as defined in clause 53, wherein the processor is operable to:

use said central band to calculate via inverse Fourier transform a first component in said interference image of said first interference pattern and said second interference pattern;

use said first sideband to calculate via inverse Fourier transform a second component in said interference image of said first interference pattern and said second interference pattern;

use said second sideband to calculate via inverse Fourier transform a third component in said interference image of said first interference pattern and said second interference pattern; and determine a first amplitude and a first phase of a first complex field of said first scattered radiation and determining a second amplitude and a second phase of a second complex field of said second scattered radiation from said first component, said second component and said third component of said interference image.

55. A dark field digital holographic microscope as defined in clause 54, wherein the processor is configured such that said determination of a first amplitude and a first phase of said complex field of said first scattered radiation and determination of a second amplitude and a second phase of said complex field of said second scattered radiation further comprises:

obtaining a modelled image of said first interference pattern and said second interference pattern, comprising a modelled first component, a modelled second component, and a modelled third component;

defining a performance function describing the matching between said interference image and said modelled image; and optimizing (e.g., minimizing) said performance function to obtain values for one or more of: said first phase, said second phase, said first amplitude and said second amplitude.

56. A dark field digital holographic microscope as defined in clause 55, wherein the processor is configured such that said optimization of said performance function further comprises:

fitting values for said first phase by taking a derivative of said performance function with respect to said first phase;

fitting values for said second phase by taking a derivative of said performance function with respect to said second phase;

fitting values for said first amplitude by taking a derivative of said performance function with respect to said first amplitude; and fitting values for said second amplitude by taking a derivative of said performance function with respect to said second amplitude.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A dark field digital holographic microscope configured to determine a characteristic of interest of a structure, comprising:

an illumination device configured to provide at least:

a first beam pair comprising a first illumination beam of radiation and a first reference beam of radiation and a second beam pair comprising a second illumination beam of radiation and a second reference beam of radiation; and an imaging branch configured to capture a first scattered radiation scattered by the structure being illuminated by the first illumination beam of radiation; and capture a second scattered radiation scattered by the structure being illuminated by the second illumination beam of radiation, the imaging branch having a detection NA greater than 0.1, wherein the illumination device is configured such that:

the first illumination beam of radiation and the first reference beam of radiation are at least partially temporally and spatially coherent;

the second illumination beam of radiation and the second reference beam of radiation are at least partially temporally and spatially coherent; and the illumination device is configured to impose temporal and/or spatial incoherence between the first beam pair and second beam pair.

2. The dark field digital holographic microscope of claim 1, wherein the illumination device is configured to direct the first illumination beam of radiation so as to illuminate the structure from a first direction and to direct the second illumination beam of radiation so as to illuminate the structure from a second direction, the second direction being different from the first direction.

3. The dark field digital holographic microscope of claim 1, wherein:

the imaging branch further comprises a sensor, the dark field digital holographic microscope is configured to simultaneously capture on the sensor a first interference pattern resulting from interference of the first scattered radiation and the first reference beam and a second interference pattern resulting from interference of the second scattered radiation and the second reference beam, and the dark field digital holographic microscope is configured such that the first interference pattern and second interference pattern at least partially, spatially overlap on the sensor.

4. The dark field digital holographic microscope of claim 3, wherein the first reference beam of radiation and the second reference beam of radiation are configured to be each incident at respective different azimuthal angles with respect to an optical axis of the dark field digital holographic microscope, and the azimuthal angle of the first reference beam of radiation and the azimuthal angle of the second reference beam of radiation is configured to comprise a sufficient large difference such that the first and second interference patterns are separable in the spatial frequency domain.

5. The dark field digital holographic microscope of claim 3, wherein the first reference beam of radiation and the second reference beam of radiation are configured to be each incident at respective different angles of incidence with respect to an optical axis of the dark field digital holographic microscope.

6. The dark field digital holographic microscope of claim 1, wherein:

the illumination device further comprises a coherence matching arrangement configured to adjustably delay one of the first illumination beam and first reference beam with respect to the other of the first illumination beam and first reference beam so as to maintain the beams of the first beam pair to be at least partially coherent and to adjustably delay one of the second illumination beam and second reference beam with respect to the other of the second illumination beam and second reference beam so as to maintain the beams of the second beam pair to be at least partially coherent.

7. The dark field digital holographic microscope of claim 6, wherein:

the illumination device comprises a time delay arrangement configured to impose incoherence between the first beam pair and the second beam pair, and the time delay arrangement comprises an adjustable time delay arrangement configured to adjustably delay one of the first beam pair and the second beam pair with respect to the other of the first beam pair and the second beam pair to impose the incoherence.

8. The dark field digital holographic microscope of claim 7, wherein:

the illumination device comprises a first branch configured to provide the first pair of beams and a second branch configured to provide the second pair of beams;

the time delay arrangement comprises at least a delay line configured to impose a delay on one of the first branch or the second branch with respect to the other of the first branch or the second branch; and the coherence matching arrangement comprises a first coherence matching arrangement in the first branch configured to adjustably delay at least one of the first reference beam and first illumination beam, and a second coherence matching arrangement in the second branch configured to adjustably delay at least one of the second reference beam and second illumination beam.

9. The dark field digital holographic microscope of claim 7, wherein: the illumination device comprises a first branch configured to provide the first illumination beam and the second illumination beam and a second branch operable to provide the first reference beam and the second reference beam; and the coherence matching arrangement and the time delay arrangement are implemented via co-optimization of at least a first adjustable delay line configured to impose an adjustable delay on one of the first branch or the second branch with respect to the other of the first branch or the second branch, a second adjustable delay line in the first branch configured to impose an adjustable delay on at least one of the first illumination beam and second illumination beam, and a third adjustable delay line in the second branch configured to impose an adjustable delay on at least one of the first reference beam and the second reference beam.

10. The dark field digital holographic microscope of claim 1, wherein the first illumination beam of radiation is configured to illuminate the structure at a first angle of incidence and the second illumination beam of radiation is configured to illuminate the structure at a second angle of incidence, different to the first angle of incidence.

11. The dark field digital holographic microscope of claim 1, wherein the illumination device comprises a single radiation source from which the illumination device is configured to generate the first beam pair and the second beam pair.

12. The dark field digital holographic microscope of claim 11, wherein the single light source is configured to emit at least partially coherent radiation.

13. The dark field digital holographic microscope of claim 1, wherein the illumination device is configured such that the first reference beam and the second reference beam are each generated at a first power level, and the first illumination beam and second illumination beam are each generated at a second power level, the second power level being greater than the first power level.

14. A metrology apparatus for determining a characteristic of interest of a structure on a substrate comprising a dark field digital holographic microscope of claim 1.

15. The dark field digital holographic microscope of claim 1, further comprising:

a first delay line configured to impose the temporal and/or spatial incoherence between the first beam pair and second beam pair, and at least one of a second delay line configured to impose a delay on the first beam pair and a third delay line configured to impose a delay on the second beam pair.

16. The dark field digital holographic microscope of claim 1, further comprising:

a first delay line configured to impose the temporal and/or spatial incoherence between the first beam pair and second beam pair, and at least one of a second delay line configured to impose a delay on the first illumination beam and the second illumination beam and a third delay line configured to impose a delay on the first reference beam and the second reference beam.

17. A method comprises:

illuminating a target formed by a lithographic process on a substrate with a first illumination beam of radiation;

capturing, using an imaging branch having a detection NA greater than 0.1, resultant first scattered radiation having been scattered from the target;

illuminating the target with a second illumination beam of radiation and capturing, using the imaging branch, resultant second scattered radiation having been scattered from the target;

imposing spatial and/or temporal incoherence between a first beam pair comprising the first illumination beam and a first reference beam and a second beam pair comprising the second illumination beam and a second reference beam, such that:

the beams of the first beam pair are at least partially spatially and temporally coherent, the beams of the second beam pair are at least partially spatially and temporally coherent, and any beam of the first beam pair is spatially and/or temporally incoherent to any beam of the second beam pair; and simultaneously generating a first interference pattern resulting from interference of the first scattered radiation and a first reference beam of radiation; and a second interference pattern resulting from interference of the second scattered radiation and a second reference beam.

18. The method of claim 17, further comprising:

imposing the spatial and/or temporal incoherence between the first beam pair and the second beam pair using a first delay line; and imposing a delay on the first beam pair or on the second beam pair using a second delay line.

19. The method of claim 17, further comprising:

imposing the spatial and/or temporal incoherence between the first beam pair and the second beam pair using a first delay line; and imposing a delay on the first illumination beam and the second illumination beam or on the first reference beam and the second reference beam using a second delay line.

* * * * *